United States Patent [19]

Kobayashi et al.

[11] Patent Number: 5,011,571

[45] Date of Patent: Apr. 30, 1991

[54] METHOD FOR TREATING PHOTOGRAPHIC PROCESS WASTE LIQUOR THROUGH CONCENTRATION BY EVAPORATION AND APPARATUS THEREFOR

[75] Inventors: Kazuhiro Kobayashi; Shigeharu Koboshi; Nobutaka Goto; Masayuki Kurematsu; Naoki Takabayashi, all of Hino, Japan

[73] Assignee: Konica Corporation, Tokyo, Japan

[21] Appl. No.: 463,929

[22] Filed: Jan. 8, 1990

Related U.S. Application Data

[63] Continuation of Ser. No. 131,651, Dec. 11, 1987, abandoned.

[30] Foreign Application Priority Data

Dec. 17, 1986 [JP] Japan ............................. 61-300510
Dec. 17, 1986 [JP] Japan ............................. 61-302543

[51] Int. Cl.$^5$ ............................................. B01D 1/00
[52] U.S. Cl. ............................. 159/47.3; 159/29; 159/DIG. 16; 203/2; 203/91; 354/299
[58] Field of Search ............... 159/47.3, 29, DIG. 16, 159/43.1, 42; 203/2, 91; 202/160, 206, 205; 430/150; 354/299, 324

[56] References Cited

U.S. PATENT DOCUMENTS

| | | | |
|---|---|---|---|
| 3,147,687 | 9/1964 | Halden | 354/299 |
| 3,449,220 | 6/1969 | Geisler et al. | 203/DIG. 14 |
| 3,733,994 | 5/1973 | Armstrong et al. | 354/324 |
| 3,869,383 | 3/1975 | Shimamura et al. | 430/430 |
| 3,891,495 | 6/1975 | Baird | 159/6.3 |
| 3,995,298 | 11/1976 | Vandeputte et al. | 354/324 |
| 4,043,907 | 8/1977 | Shimamura et al. | 430/430 |
| 4,062,031 | 12/1977 | Schröter | 354/299 |
| 4,073,705 | 2/1978 | Torikai et al. | 204/92 |
| 4,101,918 | 7/1978 | Schröter | 354/299 |
| 4,135,803 | 1/1979 | Van Houwelingen | 354/299 |
| 4,319,826 | 3/1982 | Bussche et al. | 354/299 |

FOREIGN PATENT DOCUMENTS

| | | |
|---|---|---|
| 48-84462 | 11/1973 | Japan . |
| 49-58833 | 6/1974 | Japan . |
| 49-64257 | 6/1974 | Japan . |
| 89347 | 8/1974 | Japan . |
| 49-119457 | 11/1974 | Japan . |
| 49-119458 | 11/1974 | Japan . |
| 50-22463 | 3/1975 | Japan . |
| 51-7952 | 3/1976 | Japan . |
| 12943 | 4/1976 | Japan . |
| 53-383 | 1/1978 | Japan . |
| 53-12152 | 2/1978 | Japan . |
| 53-63763 | 6/1978 | Japan . |
| 53-43271 | 11/1978 | Japan . |
| 56-33996 | 8/1981 | Japan . |
| 57-37395 | 8/1982 | Japan . |
| 57-37396 | 8/1982 | Japan . |
| 60-70841 | 5/1985 | Japan . |
| 0216349 | 10/1985 | Japan ................. 354/299 |

OTHER PUBLICATIONS

Weissberger et al, "Distillation," Technique of Organic Chemistry, vol. IV, 1965, pp. 348–351.

Primary Examiner—Virginia Manoharan
Attorney, Agent, or Firm—Frishauf, Holtz, Goodman & Woodward

[57] ABSTRACT

A method of treating photographic process waste liquor through concentration by evaporation, including heating under reduced pressure an upper part of photographic process waste liquor to concentrate by evaporation the photographic process waste liquor in such a manner that a difference in temperature may be given between the temperature of the photographic process waste liquor in the vicinity of the heated part and the temperature at a bottom part of the photographic process waste liquor, and causing a solute in the photographic process waste liquor to settle.

9 Claims, 14 Drawing Sheets

METHOD FOR TREATING PHOTOGRAPHIC PROCESS WASTE LIQUOR THROUGH CONCENTRATION BY EVAPORATION AND APPARATUS THEREFOR

This application is a continuation of application Ser. No. 131,651, filed Dec. 11, 1987, now abandoned.

BACKGROUND OF THE INVENTION

This invention relates to a method of treating photographic process waste liquor through concentration by evaporation and an apparatus therefor, and particularly, to a method of treating photographic process waste liquor through concentration by evaporation and an apparatus therefor, that are suited for treating waste liquor, produced along with development processing of light-sensitive photographic materials using an automatic processing machine, inside the automatic processing machine or in the vicinity thereof without need of collection by dealers.

In general, in the case of black and white light-sensitive photographic materials, the photographic processing of light-sensitive silver halide photographic materials is carried out with steps comprising developing, fixing, washing, etc. and in the case of light-sensitive color photographic materials, with steps comprising color developing, bleach-fixing (or bleaching and fixing), washing, stabilizing, etc.

Then, in the photographic processing for a large quantity of light-sensitive materials, there is employed a means in which the performance of processing solutions is constantly maintained by removing, while replenishing components consumed by the processing, components that may be concentrated during the processing by dissolving-out in the processing solution or by evaporation (for example, bromide ions in the developing solution, silver ions in the fixing solution, etc.). A replenishing solution is supplied for the purpose of the above replenishing, and a part of the processing solution is thrown away for the purpose of removing the above concentrated components in the photographic processing.

Recent years, because of environmental pollution or for economical reasons, the processing solutions and washing water as well are undergoing a change such that they are used in a system in which the quantity of the replenishment has been greatly decreased. The photographic process waste liquor is led from a processing tank of the automatic processing machine through a waste liquor pipe and thrown away in sewerages or the like after diluted with waste liquor of washing water or cooling water for the automatic processing machine.

However, because of tightened control in recent years against the environmental pollution, although it is possible to throw away washing water or cooling water in sewerages or rivers, it has been made substantially impossible to throw away the photographic processing solutions other than these [for example, developing solutions, fixing solutions, color-developing solutions, bleach-fixing solutions (or bleaching solutions or fixing solutions), stabilizing solutions, etc.]. Known methods for pollution-preventive treatment to decrease the burden to environmental pollution by photographic process waste liquor include, for example, an activated sludge method (Japanese Patent Publications No. 7952/1976, No. 12943/1976, etc.), an evaporation method (Japanese Unexamined Patent Publication No. 89437/1974, Japanese Patent Publication No. 33996/1981, etc.), an electrolytic oxidation method (Japanese Unexamined Patent Publications No. 84462/1973, No. 119457/1974 and No. 119458/1974, Japanese Patent Publication No. 43478/1978, etc.), an ion-exchange method (Japanese Patent Publications No. 37704/1976 and No. 43271/1978, Japanese Unexamined Patent Publication No. 383/1978, etc.), a reverse osmosis method (Japanese Unexamined Patent Publication No. 22463/1975, etc.), a chemical treatment method (Japanese Unexamined Patent Publications No. 64257/1974, No. 12152/1978, No. 58833/1974 and No. 63763/1978, Japanese Patent Publications No. 37395/1982 and No. 37396/1982, etc.), etc. which, however, can not be said to be sufficient. Accordingly, in general, the waste liquor is collected by waste liquor collecting dealers, and made harmless after secondary and tertiary treatments. However, because of increase in the cost for the collection, not only the fees for taking over the waste liquor is increasing year by year, but also the dealers are not willing to come to miniature photofinishing laboratories to collect the waste liquor because of its low collection efficiency, thus causing problems such that shops are full of waste liquor.

On the other hand, for the purpose of solving these problems and with an aim at making it possible to readily carry out the treatment of the photographic process waste liquor also in the miniature photofinishing laboratories, it is studied to heat the photographic process waste liquor to carry out evaporation of water to dryness or effect solidification as disclosed, for example, in Japanese Utility Model Unexamined Publication No. 71841/1985. As known in the studies by the inventors, harmful or very ill-smelled gases such as sulfite gas, hydrogen sulfide and ammonia gas may generate when the photographic process waste liquor is subjected to the evaporation treatment. These were found to be generated because ammonium thiosulfate and sulfites (ammonium salt, sodium salt or potassium salt) frequently used as the fixing solution or bleach-fixing solution of the photographic processing solutions are decomposed owing to high temperature. Moreover, at the time of the evaporation treatment, the water or the like contained in the photographic process waste liquor is vaporized in the form of vapor to increase the volume and increase the pressure in a evaporating vessel. Therefore, because of this pressure, the above harmful or ill-smelled gases may necessarily leak outside the evaporation treatment apparatus to cause great difficulties from a viewpoint of the work environment.

Now, to solve these problems, Japanese Utility Model Unexamined Publication No. 70841/1985 discloses a method in which an exhaust gas treating section comprising activated carbon or the like is provided at an exhaust pipe section of the evaporation treatment apparatus. This method, however, has a serious disadvantage that the vapor from a large quantity of water contained in the photographic process waste liquor causes sweating or moisture condensation at the exhaust gas treating section, so that a gas absorption treatment agent is covered with the water to instantaneously lose its gas absorption ability. Thus, this method has not been put into practical use.

To solve these problems, the present applicants have previously proposed a method of, and an apparatus for, treating photographic process waste liquor, in which when the evaporation treatment of photographic process waste liquor is carried out, a heat exchange means capable of condensing the vapor generated by the evaporation is provided and further the condensate water generated by condensation and also uncondensed components are treated, to discharge them to the outside.

However, there were found the following problems in the above proposal. Specifically, the vapor generated by evaporation treatment, which is condensed by the heat exchange means, may leak outside the apparatus before the vapor is led to the heat exchange means with good efficiency because of the pressure increased in the evaporating vessel at the time of the evaporation treatment. Since in such vapor the particularly ill-smelled harmful gas such as hydrogen sulfide is contained, this is not preferable from viewpoints of social environment and labor environment. Also, the uncondensed components having passed through the heat exchange means are discharged outside after they are treated by activated carbon or the like, but in this treatment, it is particularly difficult to remove sufficiently the ill-smelled gas and also the activated carbon may immediately lose its ability. Thus, there is a danger that such gas is discharged outside as it is. Still also, it has been revealed that when the waste liquor is treated by evaporation, there may occur the phenomenon of bumping as the waste liquor in the evaporating vessel is more concentrated, to cause the waste liquor to be scattered on the inner wall of the apparatus and fixed on the inner wall, resulting in troubles to impair the functions of the apparatus (for example, corrosion, drive failure, etc.). Still also, when the photographic process waste liquor is heated to treat it through concentration by evaporation, and particularly when, for example, the automatic processing machine is installed inside an office or the like, there may arise another problem that smelling gas such as ammonia gas, sulfite gas or the like are generated because of the evaporation of the photographic process waste liquor containing thiosulfate or ammonium thiosulfate. For this reason, it has been desired to treat the photographic process waste liquor without generation of ill-smelling inside the automatic processing machine or in the vicinity thereof, without recourse to the collection by dealers.

SUMMARY OF THE INVENTION

This invention has been made taking account of the above problems conventionally involved in the art, and a first object of this invention is to provide a method of, and an apparatus for, treating photographic process waste liquor through concentration by evaporation according to an evaporation treatment that can decrease the harmful or ill-smelling components generated by evaporation treatment of photographic process waste liquor and there may occur no thickening at an evaporating section even if a concentration treatment is continuously carried out, thus hardly causing any accidents such as bumping. A second object of this invention is to provide a method of, and an apparatus for, treating photographic process waste liquor through concentration by evaporation, that can achieve good thermal efficiency, can achieve good evaporation efficiency, can reduce energy cost and can make an apparatus compact. A third object of this invention is to provide a method of, and an apparatus for, treating photographic process waste liquor through concentration by evaporation, that may cause less bumping at the time of the evaporation treatment. A fourth object of this invention is to provide a method of, and an apparatus for, treating photographic process waste liquor through concentration by evaporation, that can achieve a very great concentration degree of the residues concentrated to dryness by the evaporation and may give only a small amount of water contained in wastes (sludge), thus being easy to handle.

To solve the above problems, a first invention provides a method of treating photographic process waste liquor through concentration by evaporation, comprising heating photographic process waste liquor under reduced pressure of 610 mmHg or less. A second invention provides an apparatus for treating photographic process waste liquor through concentration by evaporation, comprising an evaporating vessel, a pressure reducing means for reducing the pressure in the evaporating vessel to reduced pressure of 610 mmHg or less, and a heating means for heating the photographic process waste liquor fed into the evaporating vessel. A third invention provides a method of treating photographic process waste liquor through concentration by evaporation, comprising heating under reduced pressure an upper part of photographic process waste liquor to concentrate by evaporation the photographic process waste liquor in such a manner that a difference in temperature may be given between the temperature of the photographic process waste liquor in the vicinity of the heated part and the temperature at a bottom part of the photographic process waste liquor, and causing a solute in the photographic process waste liquor to settle. A fourth invention provides an apparatus for treating photographic process waste liquor through concentration by evaporation, comprising an evaporating vessel, a pressure reducing means for reducing the pressure in the evaporating vessel, and a heating means for heating an upper part of photographic process waste liquor to concentrate by evaporation the photographic process waste liquor in such a manner that a difference in temperature may be given between the temperature of the photographic process waste liquor in the vicinity of the heated part and the temperature at a bottom part of the photographic process waste liquor.

DESCRIPTION OF THE PREFERRED EMBODIMENTS

Figure 1:
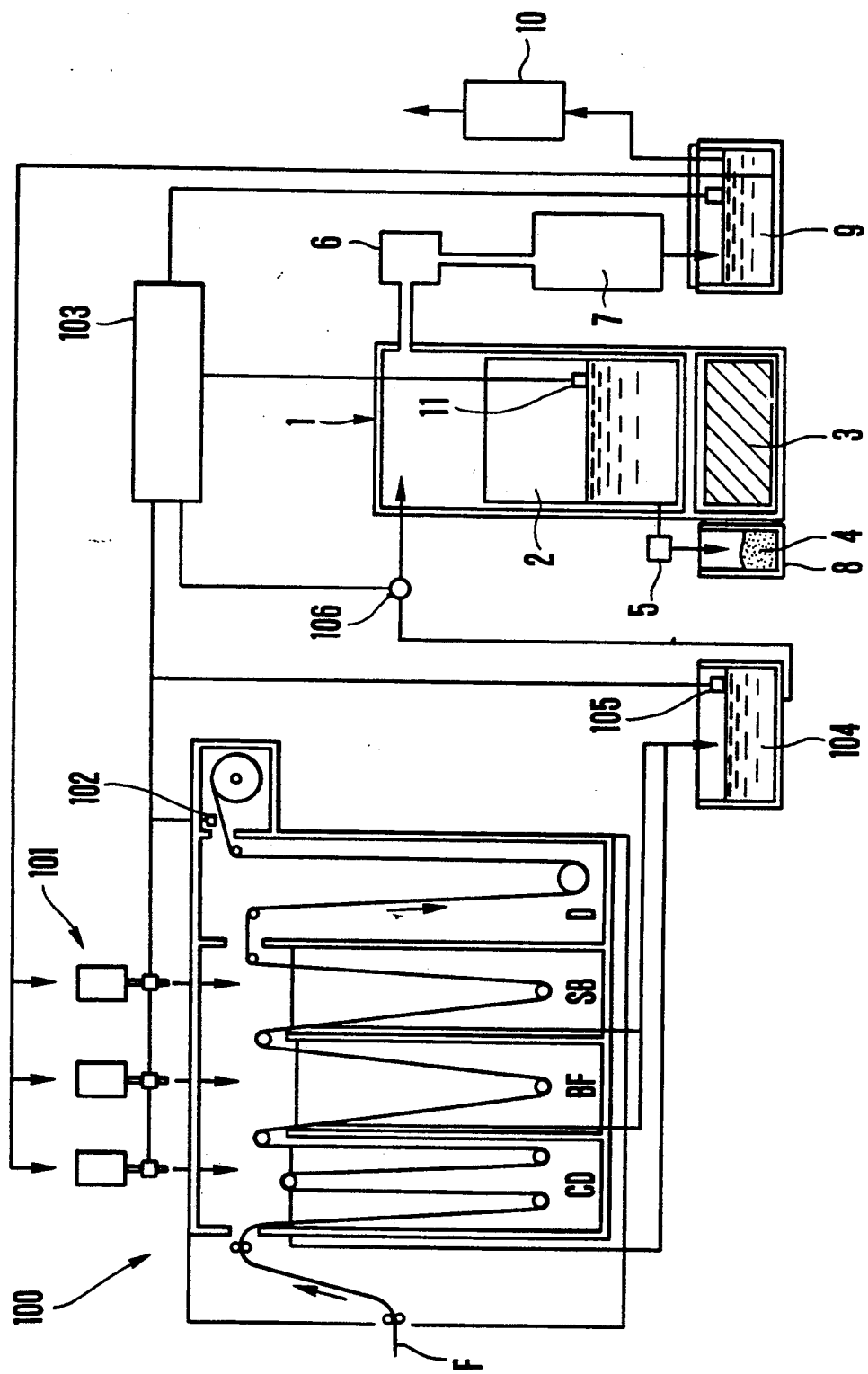
FIG. 1 is a schematic illustration of a state in which an automatic processing machine is equipped with a concentration-by-evaporation treatment apparatus.

The temperature at the bottom part of the photographic process waste liquor refers to the temperature in the vicinity being in contact with the bottom of the evaporating vessel at an initial stage in which the solute begins to settle, and, when settlings are present after settling begins, it refers to the temperature in the vicinity of the interface between the settlings of solute and the photographic process waste liquor.

The effect of this invention can be obtained by the evaporation treatment that can cause dehydration reaction to automatically occur in the photographic process waste liquor while preventing ammonia gas, sulfite gas, hydrogen sulfide, etc. from being generated because of the heating and evaporating of ammonium thiosulfate and ammonium sulfite or their corresponding sodium salts and potassium salts present in the liquor, and makes it possible to settle these compounds to remove them outside the system.

More specifically, this invention is based on a very admirable discovery that the amount of generation of ammonia gas and sulfite gas generated by evaporation together with the water vapor generated by evaporation when the photographic process waste liquor is heated can be lowered to a great extent when the heating is carried out under reduced pressure to retard the time of the generation of hydrogen sulfide gas that may begin to generate in the course of the concentration. Therefore, this invention can be greatly effective when the photographic process waste liquor contains thiosulfate serving as the origin of the generation of ammonia gas, sulfite gas and hydrogen sulfide, and can be very greatly effective when it contains ammonium thiosulfate.

Meanwhile, the present inventors have previously proposed that the photographic process waste liquor is concentrated by evaporation by heating an upper part of the photographic process waste liquor in such a manner that the difference between the temperature of the photographic process waste liquor in the vicinity of the heated part and the temperature at a bottom part of the photographic process waste liquor may become 5° C. or more, whereby as the evaporation of the photographic process waste liquor proceeds the concentrated liquid having a greater gravity descends to the lower part and the upper part is made to be comprised of a dilute liquid and thus the smell and gas generation owing to the thermal decomposition can be remarkably suppressed.

The present inventors further made studies on the above method, and, as a result, found that, although the smell and gas generation owing to the thermal decomposition can be expected to be decreased as a matter of course by lowering the temperature of the photographic process waste liquor in the vicinity of the heated part, the smell and gas generation can be unexpectedly remarkably suppressed in the instance of the above method by controlling to a lower level the temperature of the photographic process waste liquor in the vicinity of the heated part while reducing the pressure. In other words, the superior effect of suppressing the smell and gas generation can be obtained as a synergistic effect attained by the above method previously proposed by the present inventors, and also by the reduced pressure, and by controlling to a lower level the temperature of the photographic process waste liquor in the vicinity of the heated part by reducing the pressure. This is considered to be relied on the mechanism that the solubility of solute is lowered by lowering the temperature at the upper part of the evaporating vessel where the photographic process waste liquor evaporates, resulting in a lowering of the density of the solute at the upper part of the evaporating vessel, and also that the reducing of pressure affects the convection occurring between the upper part and bottom part of the evaporating vessel to enlarge the density difference of the solute between the upper part and bottom part of the evaporating vessel. This effect exceeds by far the effect obtainable by merely reducing the pressure or carrying out the treatment by lowering the temperature by reducing the pressure.

If the upper part of the evaporating vessel where the evaporation takes place has a high temperature, the temperature at the upper part of the evaporating vessel must be lowered in order to efficiently cause the solute to settle, so that in proportion thereto a greater temperature difference may arise between the upper part and bottom part of the evaporating vessel. Accordingly, the highly concentrated part descending by convection may suffer a so abrupt temperature change that the settlings to be formed may become thin and float to take much time until they deposit at the bottom part. However, if the upper part of the evaporating vessel can be made to have a lower temperature by reducing the pressure, it becomes possible to efficiently cause the solute to settle even under the smaller density difference between the upper part and lower part of the evaporating vessel, thus there can be also attained the effect that the settlings thereby formed can be made relatively large to settle more speedily and densely.

Accordingly, the third and fourth inventions are based on also the finding described above.

In order to obtain the effect of this invention, the pressure may preferably be reduced to 610 mmHg or less, more preferably 520 mmHg or less, and particularly preferably 230 mmHg or less. There is no particular limitation for the lower limit of the pressure-reducing, but, taking account of the cost for the apparatus for making up the state of reduced pressure, it may preferably be not less than 1 mmHg, or preferably not less than 10 mmHg for managing with a simple apparatus.

The temperature of the photographic process waste liquor may vary depending on the type of the waste liquor, the state of reduced pressure and so forth, and can not be determined unconditionally, but may generally be 30° C. to 100° C., and, taking account of the energy cost, the treatment speed for the waste liquor, and so forth, it may preferably be 40° C. to 80° C., more preferably 50° C. to 70° C.

In this invention, because of the pressure reducing means provided, the temperature of the photographic process waste liquor in the evaporating vessel is lowered to 100° C. or less. For this reason, not only the heating can be effected with a lower energy, but also there may be produced less tar in the concentrate formed by evaporation as compared with the conventional evaporation method, resulting also in decrease in the deposits on the wall of the evaporating vessel.

The temperature difference required in this invention is preferably at least 5° C., more preferably 10° C. or more, and particularly preferably 30° C. or more. If feasible on account of the apparatus, a more desirable embodiment is such that the temperature difference is 40° C. or more, or 50° C. or more. The greater the temperature difference is, the more effectively the effect of this invention can be exhibited. Namely, the difference in the solute concentration between the upper part and lower part of the evaporating vessel becomes greater, and the evaporation efficiency can be improved at the evaporating part. Also, there can be generated less rank odor and harmful gas, and still also the deposit of settlings may readily occur at the lower part having a low temperature, of the evaporating vessel.

Moreover, in the evaporation process of this invention, the sludge may be naturally settled to the lower part of the evaporating vessel. Accordingly, in a preferred example, the settlings are continuously taken out from the lower part of the evaporating vessel and thereby the photographic process waste liquor can be automatically fed from the upper part, so that a continuous evaporation treatment can be carried out semipermanently.

The settlings may be continuously taken out by means of an endless belt, or taken out by means of a rotatable spiral sleeve or by any other means.

In general, it is desirable to take out the settlings at the bottom part of the evaporating vessel according to a batch system after a given quantity of photographic process waste liquor has been treated. Also, as one of remarkable features of this invention, the temperature at the lower part of the evaporating vessel is so low that the settlings can be taken out during drive without any danger and without rank order or harmful gas, thereby extremely safe driving can be conducted.

In the evaporating vessel used in this invention, the photographic process waste liquor heated by a heating means provided at the upper part is concentrated, and thus concentrated thick liquor goes down to the lower part. Accordingly, the evaporating vessel necessarily requires a distance from the heating means to the bottom part of the photographic process waste liquor.

The longer the above distance is, the more preferably the temperature difference can be produced to cause the difference in concentration of solute between the heated part and the settling part, but, although not unconditionally determinable as it depends on the shape of the evaporating vessel or the volume of the heating means, it may be found in advance by experimental approach. The photographic process waste liquor may preferably be fed from an upper part of the evaporating vessel.

The pressure reducing means used in this invention includes a vacuum pump, an ejector, etc. In the instance in which the ejector is used, the water fed into the ejector may be led directly from a cock of city water, or stocked water may preferably be circulated by means of a pump since this can save the piping. In a more preferred embodiment, there can be included a method in which condensate water is circulated by means of a pump and fed into the ejector.

The pressure reducing means may be directly connected to the evaporating vessel to reduce directly the pressure in the evaporating vessel, or may preferably be provided on a vapor discharging pipe for leading the vapor generated by the evaporation. Alternatively, there may be further taken the constitution such that the vapor generated by evaporation is led through a vapor discharging pipe to a heat exchange means for condensing it and the condensate water produced by condensation is led to a condensate water tank through a condensate water discharging pipe, wherein the pressure reducing means is provided on the condensate water discharging pipe or on the condensate water tank to effect the pressure-reducing. As a preferred embodiment, in the instance the condensate water is circulated by means of a pump and fed into the ejector, there may be employed a method in which the vapor discharging pipe is directly connected to the ejector and the vapor is led into the condensate water to cool the vapor. In this instance, it is possible to take various means for cooling the condensate water such that the stock tank for the condensate water or the circulating pipe for circulating the condensate water is provided with a heat-dissipation plate to cool the condensate water, or cooling water is used or a refrigeration machine is used to cool the condensate water directly or through cooling water, or the condensate water is allowed to fall in the form of a shower to effect the heat dissipation.

Another preferred embodiment for circulating the condensate water by means of a pump to feed it into the ejector include a method in which the vapor is condensed by a heat exchange means and thereafter the condensate water and part of the vapor are led to the ejector through a condensate water discharging pipe.

As the pressure reducing means, a vacuum pump described in 86/87 Kagakukiki Soran (86/87 Comprehensive Bibliography of Scientific Equipments; compiled and published by Tokyo Kagaku Kiki Kyokai), pp. 537–610 can be also used as other than the one described above.

In a preferred embodiment of the treatment apparatus of this invention, the apparatus comprises a means for liquefying the vapor generated by the concentration by evaporation, and also comprises a means for collecting the vapor thus liquefied, and more preferably comprises a means for cooling the vapor and/or the condensate water used for liquefying the vapor. It may also preferably comprise a means for collecting the concentrates obtained by the above concentration by evaporation.

In this invention, the photographic process waste liquor may preferably be fed depending on the amount of evaporation. In specific instances, the quantity of evaporated and condensate water may be detected or the variation in the quantity of the liquor in the evaporating vessel may be detected. Means for detecting the liquor quantity include means for detecting the weight of the liquid, a liquid level, etc. Among the means for detecting the liquid level, particularly preferred is a means for detecting the liquid level in the evaporating vessel.

As another embodiment, particularly preferred is a system in which the waste liquor is automatically fed in an amount corresponding to the amount decreased by evaporation, according to a bird water-drinking system. This is preferred as a simple continuous treatment system, because it requires no equipment such as the means for detecting the liquid level and thus an inexpensive and simple apparatus can be constituted as the apparatus.

The heating means of this invention includes a heating means disposed at the outside of the evaporating vessel for holding the photographic process waste liquor, or a heating means immersed in the photographic process waste liquor held in the evaporating vessel. The heating means disposed at the outside may include, for example, a far-infrared heater, a hot air type heater, a quartz-sheathed element heater, a pipe heater, a ceramic heater, a plate heater, etc. However, from a viewpoint of the evaporation efficiency, particularly preferred is a direct heating system that can directly heat the waste liquor as a whole at the inside of the evaporating vessel. In this instance, the heater may preferably be a heater sheathed with a material whose surface may not be damaged by the photographic process waste liquor (for example, SUS 316 stainless steel, titanium steel, Hastelloy C, quartz sheath, glass, etc.). These heating means may preferably be provided with a means for preventing liquid-empty heating with use of an overheat preventing temperature controller.

Figure 8:
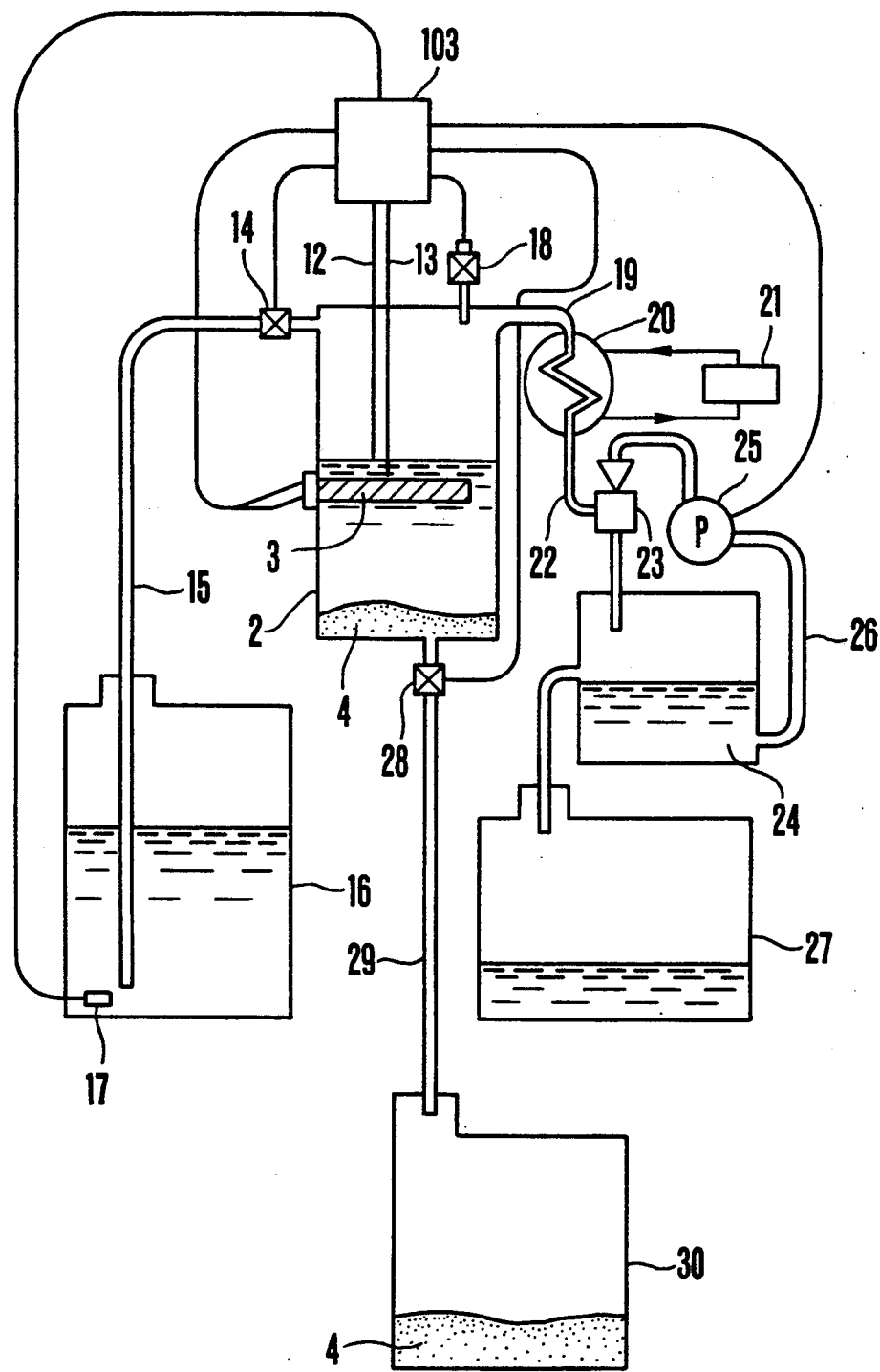

The evaporating vessel may preferably be separated into the upper and lower parts and a settlings-depositing chamber so that the settlings can be taken out during drive. Particularly preferred is a type in which the upper and lower parts of the evaporating vessel can be separated from the settlings-depositing chamber by means of a ball valve or a solenoid valve so that the settlings can be taken out from a lower part during drive. However, still particularly preferred is a type in which, as shown in FIG. 8, the settlings can be continuously taken out from a pipe section of the evaporating vessel, having a shape of U-tube and containing no heater.

Constructing the apparatus in the above manner, the evaporation treatment of the photographic process waste liquor can be continuously carried out, making it possible for users to treat the photographic process waste liquor in a very high efficiency and with simplicity.

In this invention, as a working embodiment of the treatment by the batch process, the means for taking out the settlings comprises taking out them in a bag for discharge of settlings or a screw joint type or instantly detachable type polyethylene bottle provided at a lower part of the evaporating chamber, and then they can be thrown away. These bag and bottle may preferably be made of an organic resin endurable to a temperature of about 20° C. to 90° C., and there can be used nylon 6,5 type, nylon 6,6 type, polyamide type, vinyl chloride type or polyethylene type resin.

As a preferred embodiment of this invention, it is possible to pass the condensate water through a gas treating column and connect it to the open air. This makes it possible to prevent a harmful gas from leaking outside even if it is generated in a trace amount from the condensate water. This can be achieved by introducing the open air from the outside through the gas treating column. In the gas treating column, adsorbents or deodorizers including, for example, activated carbon, zeolite, etc. may be used.

Figure 3:
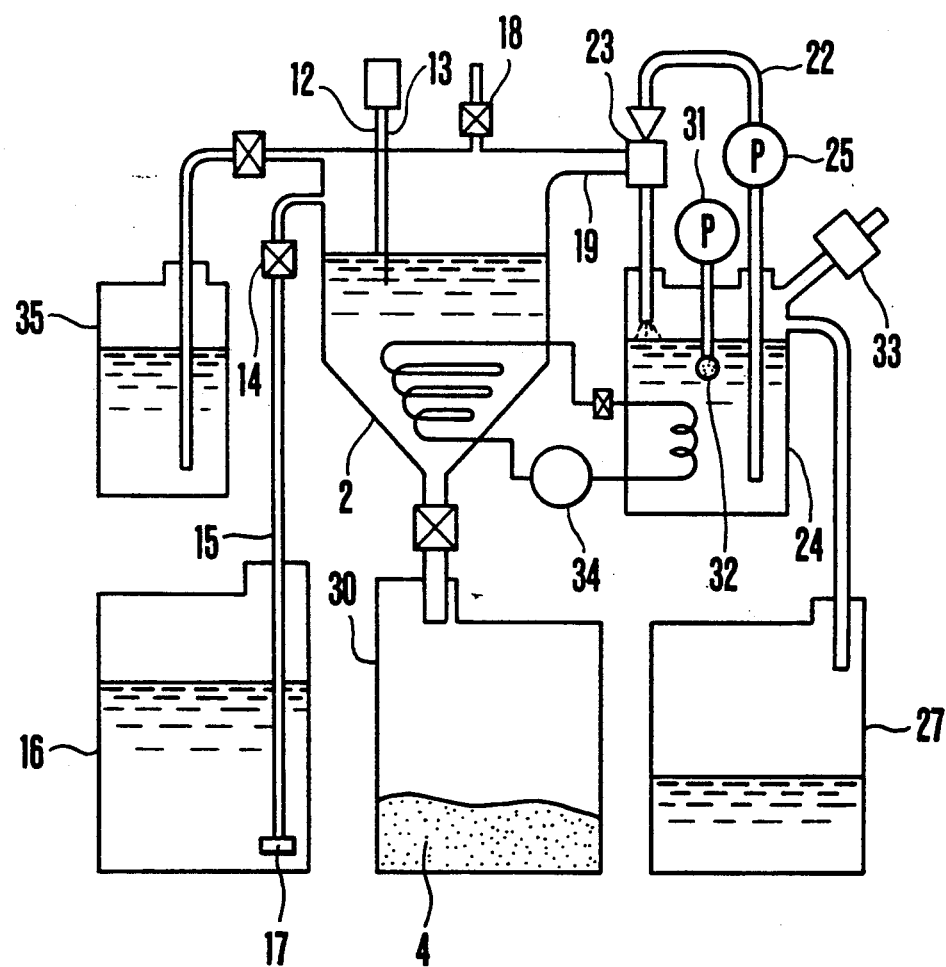
FIG. 3 to FIG. 6 are schematic illustrations showing other examples.
Figure 4:
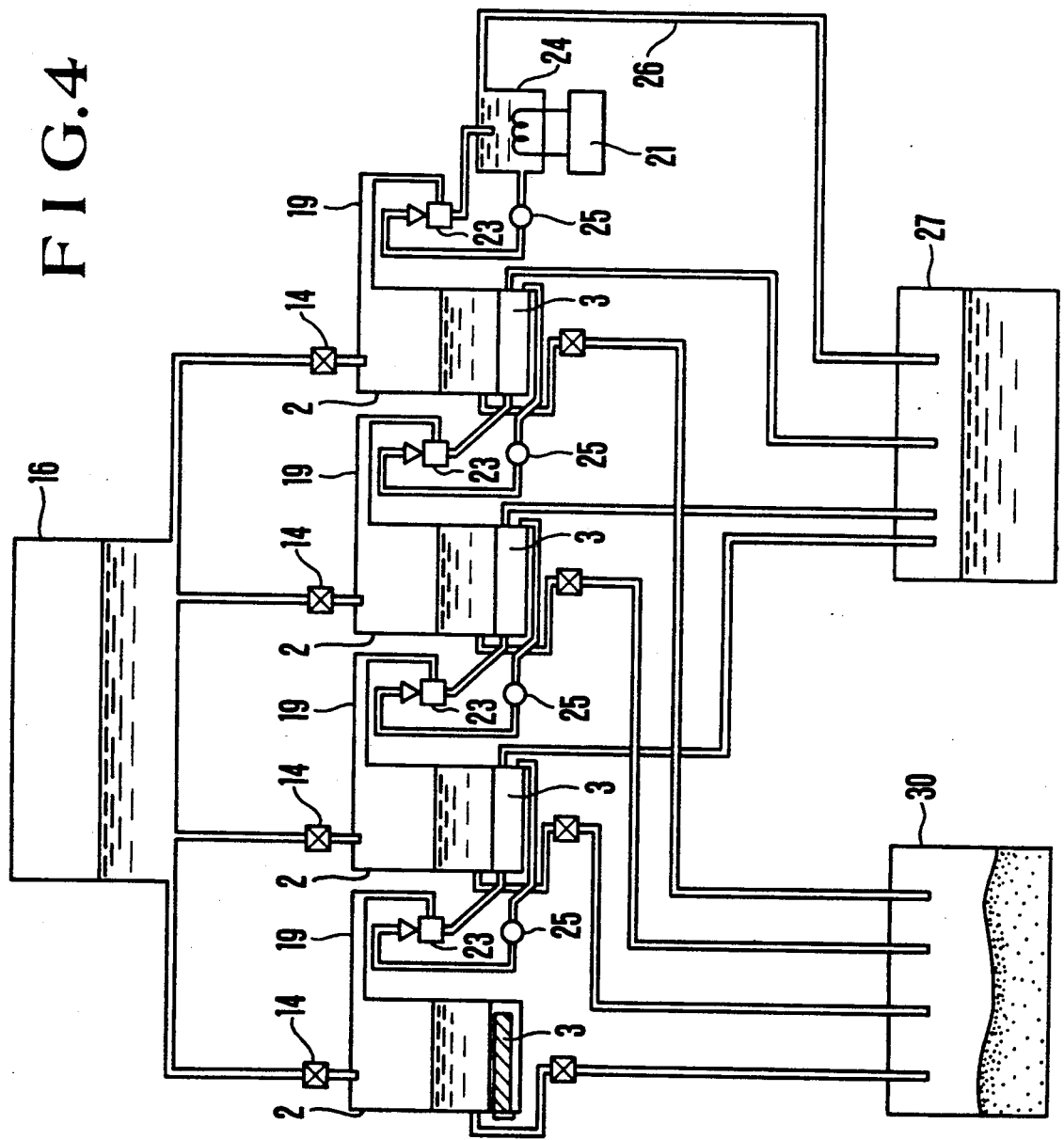
Figure 9:
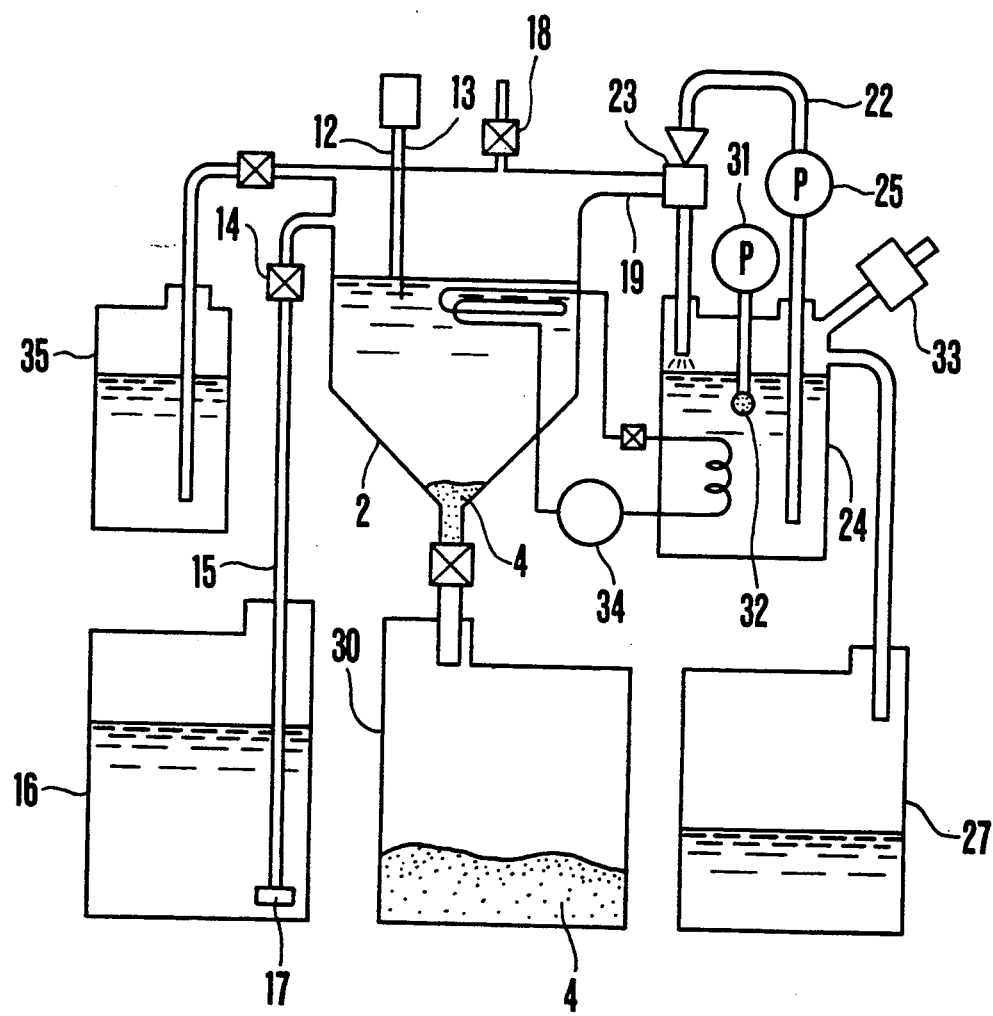
Figure 10:
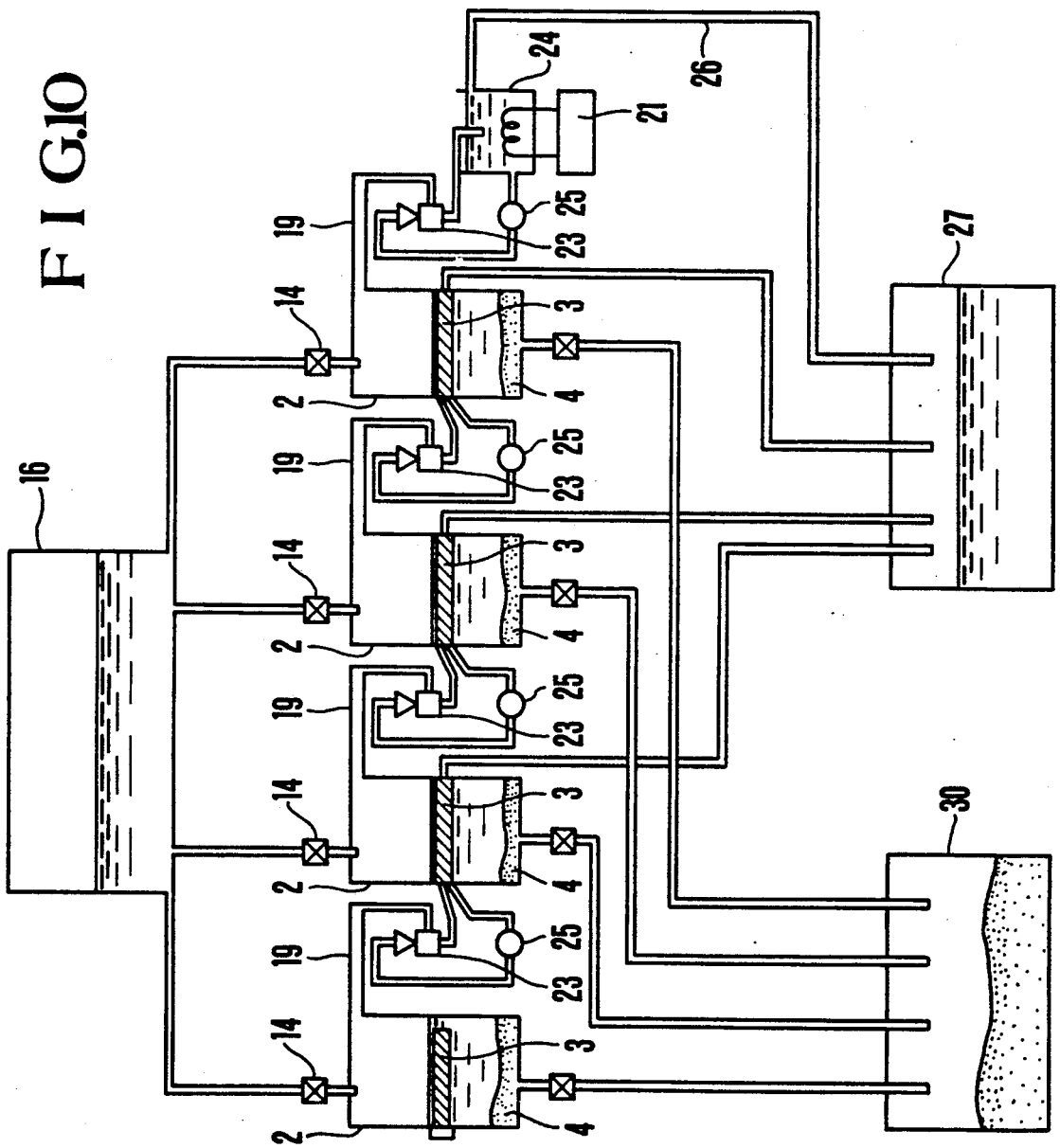
Figure 11:
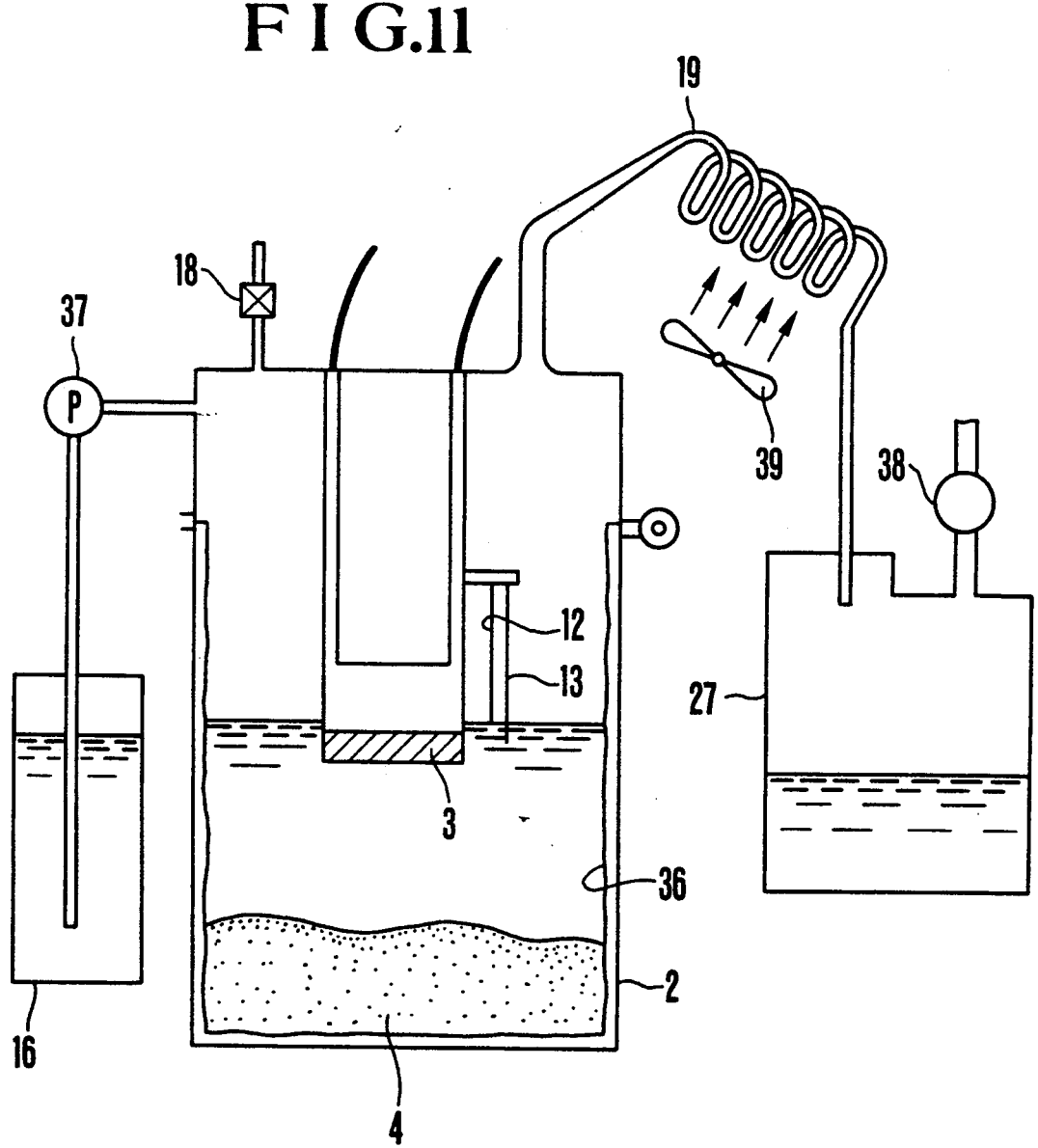
Figure 12:
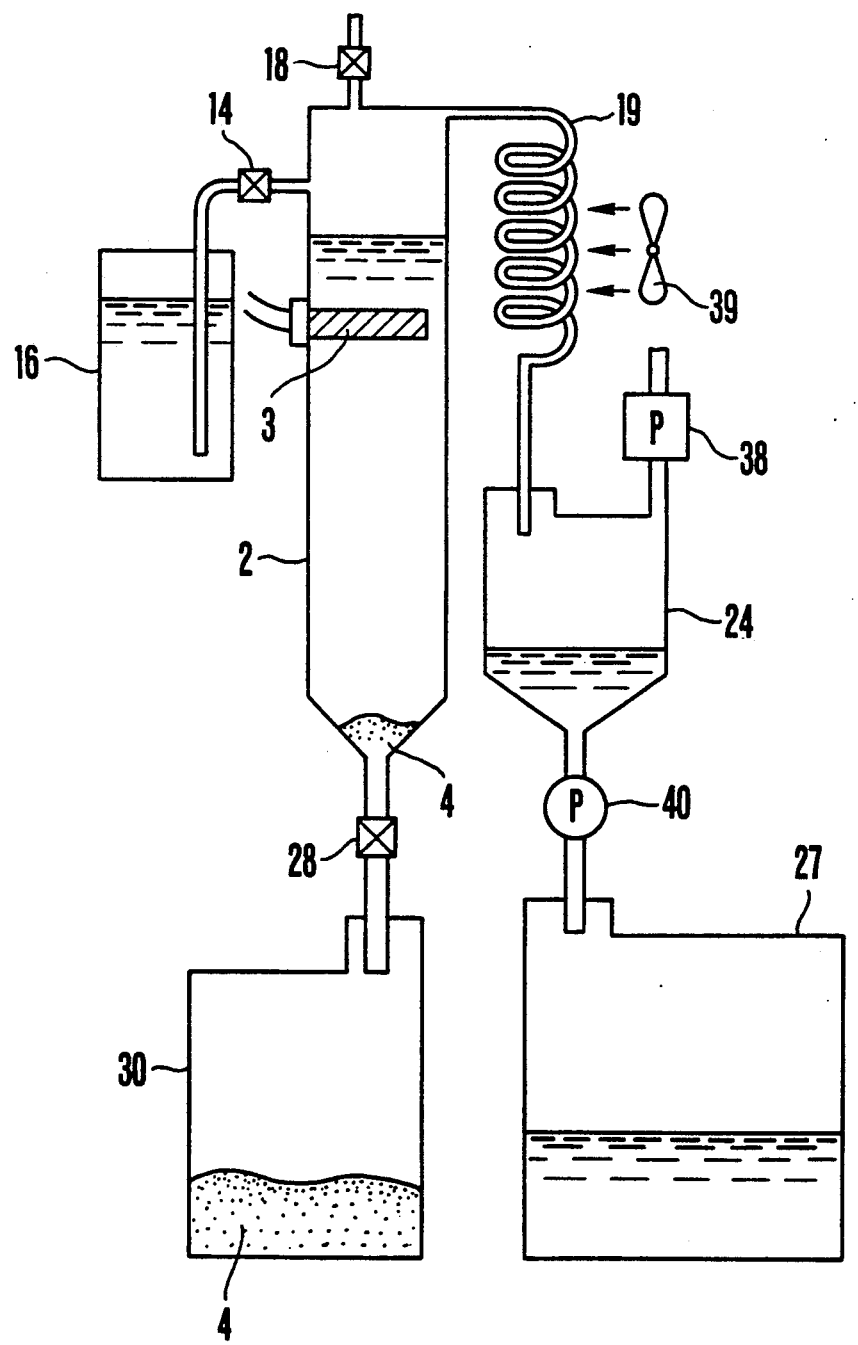

In order to decrease the hating energy cost, it is preferable in this invention to use the evaporating vessel in a large number as shown in FIG. 4 or FIG. 10 and to use the condensate water as a heat source for other vessels. This means is very preferable as this utilizes the evaporation latent heat that occupies a greater part of the heating energy and can greatly decrease the heating energy cost. In order to decrease the heating energy cost, it is further preferable in this invention to carry out a method in which, as shown in FIG. 3 or FIG. 9, Freon gas or the like is used as a heat transfer medium to take off the heat of the condensate water to effect cooling on the same principle as that of a cooler or refrigerator and the heat is given to the evaporating vessels. In this instance, the heat generation from the treatment apparatus of this invention can be made very small, and thus it becomes possible to install the treatment apparatus even in a closed room, while the treatment apparatus could not heretofore be installed in such a closed room due to heat generation.

Incidentally, it may sometimes occur that a trace harmful gas generated when the photographic process waste liquor is subjected to the evaporation treatment is dissolved in the condensate water, and, in some cases, components having a great burden to environmental pollution may be mixed therein. For example, it may sometimes occur that sulfite gas, ammonia and hydrogen sulfide gas, and also organic solvents or organic acids such as ethylene glycol, acetic acid, diethylene glycol or benzyl alcohol turned to a gas by the azeotropy with water are flowed out in the condensate water.

For this reason, it can be also considered that the condensate water has a great burden to environmental pollution such as BOD and COD and it can not be discharged as it is into sewerages or rivers. Accordingly, in this invention, oxidizing agents or pH adjusters are added in the condensate water, or, if necessary, preferably used is a filtering means (particularly a filtering means containing activated carbon) provided at a latter stage of a section for condensing the vapor generated by evaporation.

In this invention, for example, for the purpose of decomposing the harmful gas, ozone can be brought into contact with the condensate water. As another means, preferably used is a means of catalytic combustion using platinum or palladium alloy, which means is particularly effective against ammonia gas. Also, as shown in FIG. 3 or FIG. 9, for example, an air-feeding pump and a gas purger can be used to aerate the condensate water to oxidize the reducible components in the condensate water.

In the treatment apparatus of this invention, the invention can be effective when the waste liquor is the photographic process waste liquor and contains a large quantity of thiosulfate, sulfite and ammonium salts, and, in particular, very effective when it contains organic ferric complex salts and thiosulfates.

As a preferred example for applying this invention, this invention is suited for treating the photographic process waste liquor produced along with the development processing of light-sensitive photographic materials with use of an automatic processing machine, in the automatic processing machine itself or in the vicinity thereof. Here will be described the automatic processing machine, the concentration-by-evaporation treatment apparatus and the photographic process waste liquor.

Automatic processing machine and concentration-by-evaporation treatment apparatus In FIG. 1, the automatic processing machine is denoted by the numeral 100, and the concentration-by-evaporation treatment apparatus is denoted by the numeral 1. The automatic processing machine 100 shown therein is of a system in which a rolled light-sensitive photographic material F is continuously guided to a color developing tank CD, a bleach-fixing tank BF and a stabilizing tank SB to effect photographic processing, and rolled up after drying D. The numeral 101 denotes replenishing solution tanks. The photographic processing amount of the light-sensitive photographic material F is detected by a sensor 102, and replenishing solutions are supplied in the respective processing tanks through a controlling device 103 according to the detected information.

Once the replenishing solutions are supplied to the respective photographic processing tank, overflowed waste liquor is discharged from the processing tanks and collected in a stock tank 104. As a means for moving the overflowed photographic process waste liquor to the stock tank 104, there may be mentioned a simple method to allow the waste liquor to naturally drop through a guide tube. In some case, it can be forcedly transported by means of a pump or the like.

The concentration-by-evaporation treatment apparatus 1 is comprised of an evaporating vessel 2, a heating means 3, a discharging means 5 for discharging settlings 4 produced as the concentration by evaporation proceeds in the photographic process waste liquor, a vapor cooling means 6, a pressure reducing means 7 and so forth. The settlings 4 discharged from this discharging means 5 is stocked in a settlings-holding container 8, and the condensate water which has been subjected to pressure-reduction treatment by the pressure reducing means 7 is stocked in a condensate water tank 9. A gas adsorbing means 10 comprising a filter, an adsorbent or the like can be added to this condensate water tank 9.

The heating means 3 includes the means utilizing any one of effective heat sources such as electricity, gas, solar heat, etc. or two or more of them in combination and capable of heating the photographic process waste liquor and causing the photographic process waste liquor to be concentrated by evaporation. As the heating method, there can be used a method in which the photographic process waste liquor is stocked in the evaporating vessel 2 and the whole is heated, as well as the method described in the specification in Japanese Unexamined Patent Publication No. 201442/1987. The heating means 3 may be positioned at any part, e.g., at an upper part or inside of the photographic process waste liquor stocked, or at the outside of the evaporating vessel 2.

The discharging means 5 can be designed in various manners, including a known discharging apparatus utilizing a rotary screw pump, or a means in which the concentrated liquid of the photographic process waste liquor is allowed to naturally fall in a container containing one or more of liquid-absorptive resins and solidifying agents, from a bottom part of the evaporating vessel 2 through a valve, and then solidification is effected.

The amount and temperature of the photographic process waste liquor in the stock tank 104 are detected by a sensor 105, and the information obtained therefrom is stored in a controlling device 103. When it is detected that the stock tank is full of the photographic process waste liquor, the supply of the replenishing water is stopped so that any additional photographic process waste liquor may not be discharged, or a pump 106 is driven to feed the photographic process waste liquor from the stock tank 104 to the evaporating vessel 2. To prevent a miss-operation, it is preferable to leave an allowance in the capacity of the stock tank 104, or to dispose a plurality of tanks or a reserve tank in advance. In the apparatus of a system in which the photographic process waste liquor is not treated in a lump but separately treated depending on the kind of the photographic process waste liquor, the liquid amount and liquid temperature are detected for each of the stock tank 104.

The detection of the temperature of the photographic process waste liquor in the stock tank 104 is important as the information of photographic process waste liquor for the drive control of the concentration-by-evaporation treatment apparatus 1 described herein, particularly for the control of the heating temperature.

The photographic process waste liquor can be fed from the stock tank 104 to the concentration-by-evaporation treatment apparatus 1 according to a method of feeding a given amount thereof in a lump or a method of feeding a given amount or variable amount thereof in a continuous manner. In the former instance, the feeding from the stock tank 104 to the concentration-by-evaporation treatment apparatus 1 is controlled according to the information detected by the sensor 105 on a decrease in amount of the photographic process waste liquor stocked in the stock tank 104, or the information detected by a sensor 11 on the photographic process waste liquor remained in the evaporating vessel 2. In this instance, the above feeding may be also controlled according to the information detected by a flowmeter provided on the pipe for feeding the waste liquor from the stock tank 104 to the concentration-by-evaporation treatment apparatus 1.

In the method of feeding the waste liquor in a given amount or variable amount, the amount of the photographic process waste liquor to be fed is controlled according to the temperature of the photographic process waste liquor to be fed and the temperature of the heating means 3 or evaporating vessel 2 of the concentration-by-evaporation treatment apparatus 1. Alternatively, making always constant the amount of the photographic process waste liquor to be fed, the amount of the photographic process waste liquor in the concentration-by-evaporation treatment apparatus 1 may be detected by the sensor 11 so that, according to the amount thus detected, the heating temperature given by the heating means 3, for example, a heater, may be controlled so as to be raised or lowered or the heating time may be controlled so as to be increased or decreased.

The concentration-by-evaporation treatment apparatus 1 is controlled according to the difference between the amount of the photographic process waste liquor to be fed and the photographic process waste liquor having been treated, or according to the amount of the photographic process waste liquor remaining in the apparatus or the amount of the photographic process waste liquor having been treated and concentrated.

To describe additionally, in the apparatus of the method of feeding a given amount of the photographic process waste liquor in a lump to the concentration-by-evaporation treatment apparatus, it is possible to control the operation of the concentration-by-evaporation treatment apparatus 1 by controlling the treatment time if the temperature of the photographic process waste liquor to be fed and the temperature of the heating means 3 or evaporating vessel 2 have been detected.

The feeding, the treatment (evaporation and concentration) and the discharging of the photographic process waste liquor can be controlled according to the various items as described above, but, corresponding thereto, there can be also used a variety of sensors such as the sensor 11 for detecting the time, viscosity, pressure, liquid level, concentration, electrical resistance, weight, etc., and also the sensor 11 or the like can be mounted at various positions.

Photographic process waste liquor

The photographic process waste liquor that can be treated by this invention may typically include the waste liquor produced when a light-sensitive silver halide color photographic material is processed. However, the photographic process waste liquor that can be treated by this invention may not be limited to this, and may include the waste liquor produced when other light-sensitive silver halide color photographic materials are processed.

Examples

Figure 2:
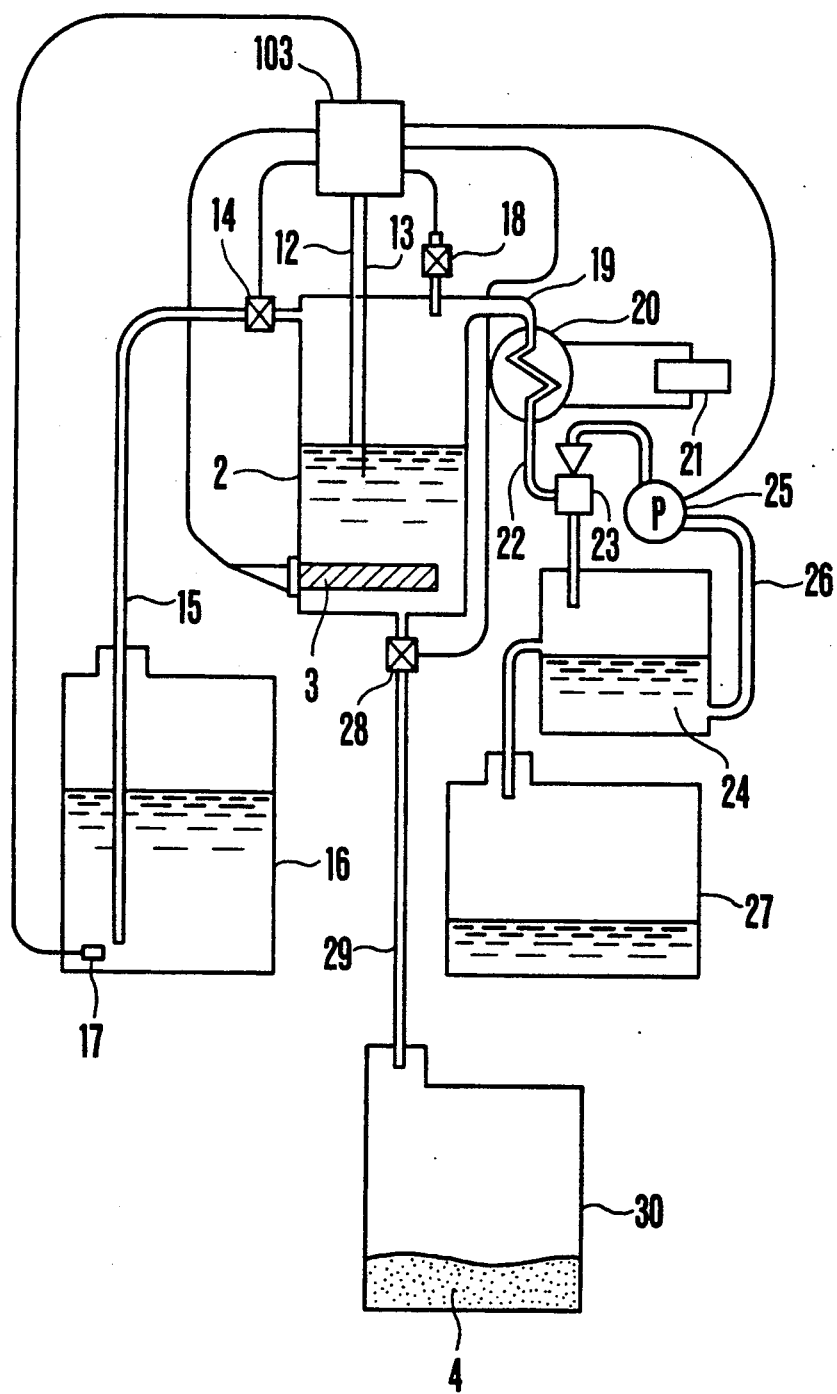
FIG. 2 is a schematic illustration showing a more specific example of this invention.

FIG. 2 is a schematic illustration of an example more specifically illustrating this invention. The heating means 3 is provided inside the evaporating vessel 2 of the concentration-by-evaporation treatment apparatus, and an upper limit liquid level sensor 12 and a lower limit liquid level sensor 13 are provided above this heating means 3 to prevent the liquid-empty heating in the evaporating vessel 2. A waste liquor feeding pipe 15 having a solenoid valve 14 is provided at an upper part of the evaporating vessel 2, so that the photographic process waste liquor can be fed from a waste liquor tank 16 to the evaporating vessel 2 by actuating the solenoid valve 14. This waste liquor tank 16 is provided with a liquid level sensor 17 for detecting the amount of the remaining photographic process waste liquor to input the information on liquid amount to the controlling device 103.

Another solenoid valve 18 for cancelling the reduced pressure is provided at an upper part of the evaporating vessel 2, a vapor-discharging pipe 19 is further connected at an upper part of the evaporating vessel 2, and a condenser 20 is provided on this vapor-discharging pipe 19, so that the water cooled by a refrigerating machine 21 can be circulated therethrough. From the condenser 20, condensate water is introduced into an ejector 23 together with a part of the vapor through a condensate water introducing pipe 22, and thereafter stocked in an auxiliary condensate water tank 24. The condensate water in this auxiliary condensate water tank 24 is circulated through a circulating pipe 26 by driving a pump 25. The condensate water overflowing from this auxiliary condensate water tank 24 is stocked in a condensate water tank 27. Also, a discharging pipe 29 having a solenoid valve 28 is connected to a lower part of the above evaporating vessel 2, so that the settlings 4 formed by concentration of the photographic process waste liquor can be discharged to a settlings-holding tank 30 by actuating the solenoid valve 28.

To describe an outline of the process of carrying out the heating and evaporation treatment with use of this apparatus, the photographic process waste liquor stocked in the waste liquor tank 16 is fed to the evaporating vessel 2 through the waste liquor feeding pipe 15 until the liquid is detected by the upper limit liquid level sensor 12. The photographic process waste liquor in the evaporating vessel 2 is heated and evaporated by means of the heating means 3, but, when the liquid level is lowered until it is detected by the lower limit liquid level sensor 13, the waste liquor is again fed until it reaches the level of the upper limit liquid level sensor 12. The vapor generated by evaporation is forwarded to the condenser 20 through the vapor-discharging pipe 19 and cooled there. Thereafter the condensate water and vapor are introduced in the ejector 23 through the condensate water introducing pipe 22, and provisionally stocked in the auxiliary condensate water tank 24. This stocked condensate water is further fed to the ejector 23 through the circulating pipe 26 by driving the pump 25, whereby the inside of the evaporating vessel 2 is put in a pressure-reduced state.

On the other hand, as the concentration proceeds, the settlings 4 formed are deposited in the evaporating vessel 2 and replace the photographic process waste liquor in the evaporating vessel 2, but the liquid level sensor 17 in the waste liquor tank 16 detects that the waste liquor became short, the information thus obtained is noticed by means of a warning busor, a warning lamp or the like, and the heating means 3 is cut off at the same time. Also at the same time, the solenoid valve 28 is opened, so that the settlings 4 fall in the settlings-holding tank 30.

Figure 13:
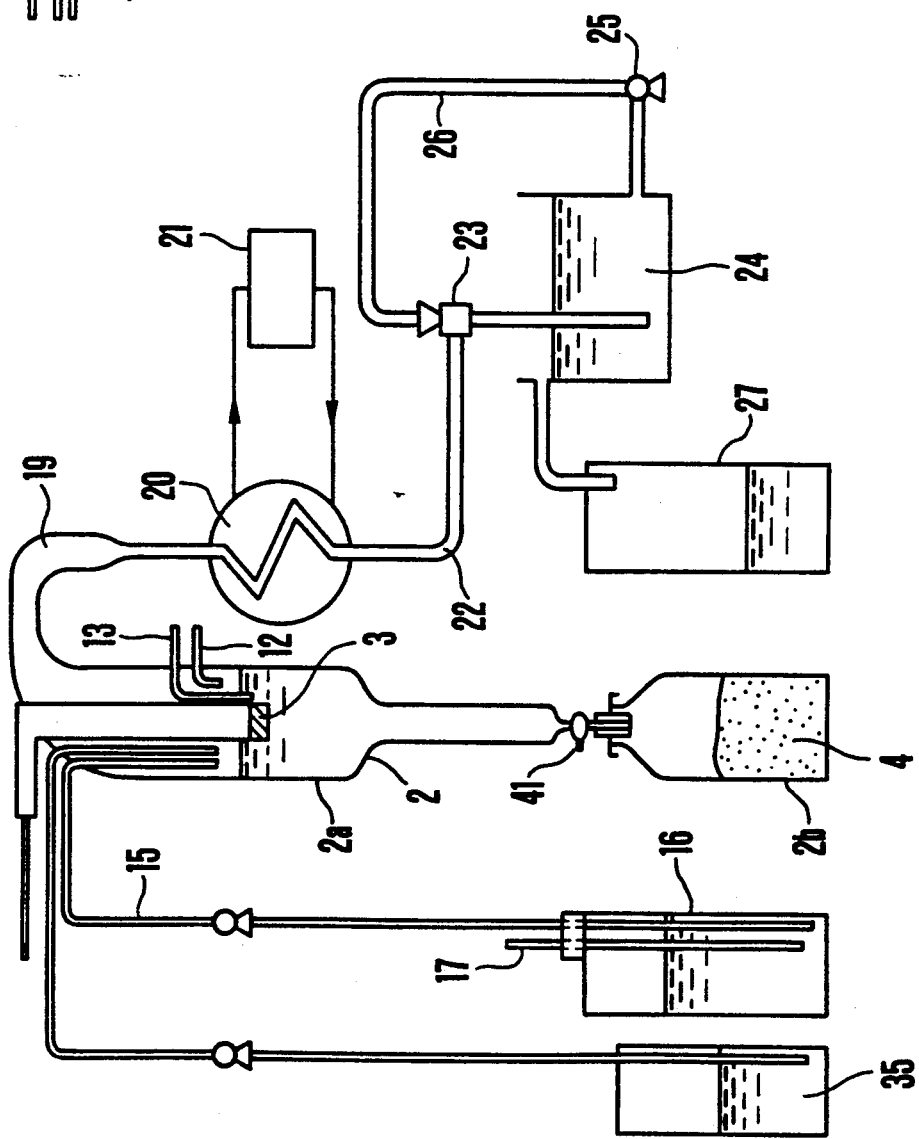
FIG. 13 is an schematic illustration showing an example in which the apparatus has a constitution similar to that in FIG. 9 except that a heater 34 is replaced with a conventional heater 3 as in FIG. 8, and having a characteristic feature in the shape of the evaporating vessel.

Various shapes available for the evaporating vessel 2 of the treatment apparatus of this invention are illustrated in the specification and in FIG. 2 to FIG. 8 of the drawings attached to Japanese Patent Application No. 288328/1986; various methods available for taking out the settlings, in FIG. 9 to FIG. 12 of the same; and methods for continuously feeding the photographic process waste liquor, in FIG. 13 of the same.

Other examples of this invention employing the pressure reducing means are shown here in FIG. 3 to FIG. 6. FIG. 3 illustrates an example in which an evaporating vessel 2 is put in a pressure-reduced state by means of an ejector 23 and thereafter the condensate water is introduced in an auxiliary condensate water tank 24, wherein there are further equipped with an air-feeding pump 31 and a gas purger 32 to aerate the condensate water to effect the oxidation of the redusible components of the condensate water. From the viewpoint of the safety, the auxiliary condensate water tank 24 is provided with a gas adsorbent 33 for preventing the discharge of smelling gas. Further, a freon gas or the like is circulated as a heat transfer medium by driving a compressor 34 to take off the heat of the condensate water to cool it so that the heat can be given to the evaporating vessel 2. Also, an agent solution is fed from an agent solution feeding pipe 35 to the photographic process waste liquor in the evaporating vessel 2. In FIG. 4, the evaporating vessel 2 is prepared in a large number. A lower part of the evaporating vessel 2 located at the left side in this Figure is heated by means of a heating means 3 such as a heater, and the condensate water from this evaporating vessel 2 is led through an ejector 23 to a room at an upper part of the evaporating vessel 2 disposed at the next stage to serve as a heating source. Utilizing the evaporation latent heat in this manner, the heating energy cost can be greatly decreased.

Figure 5:
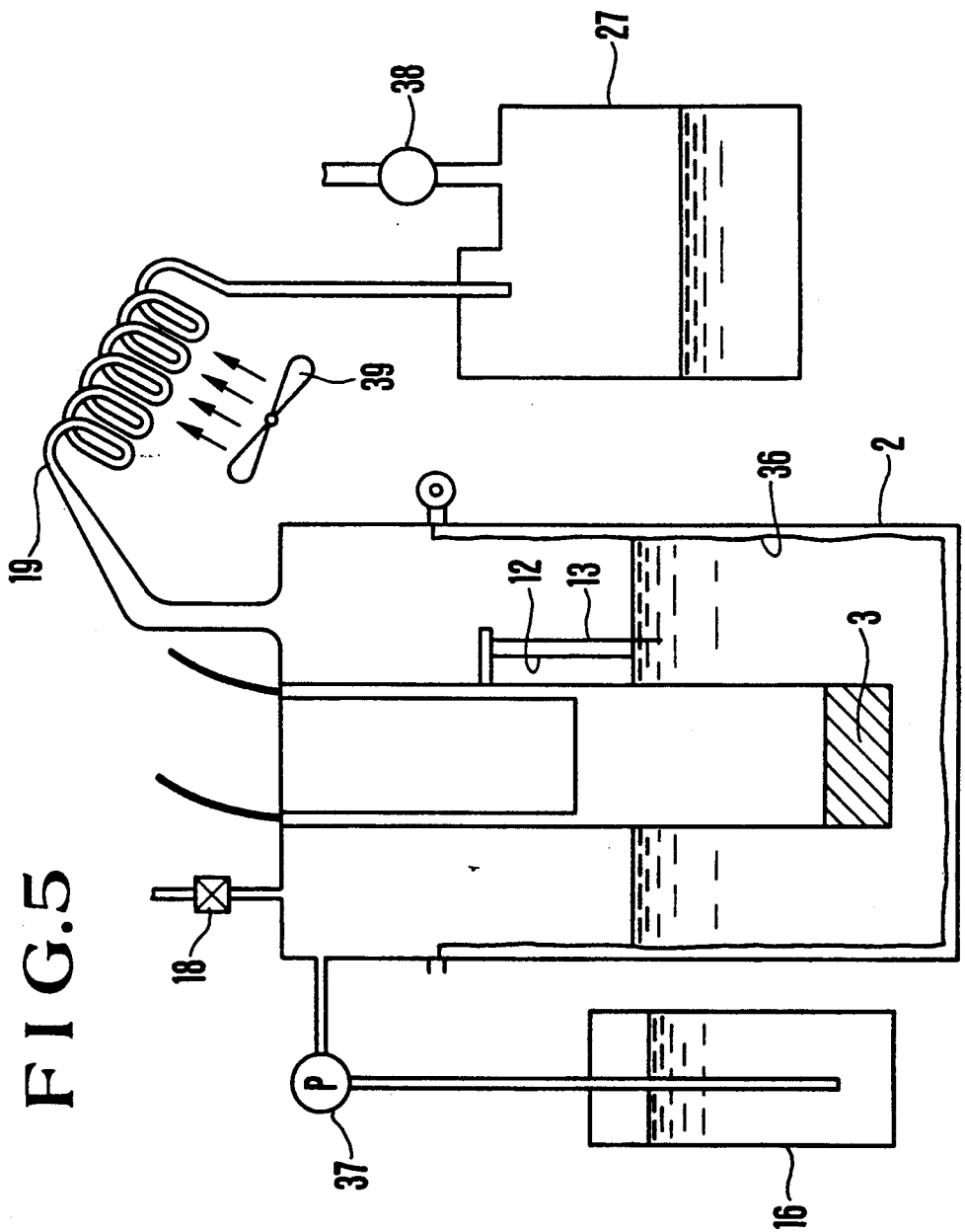
Figure 6:
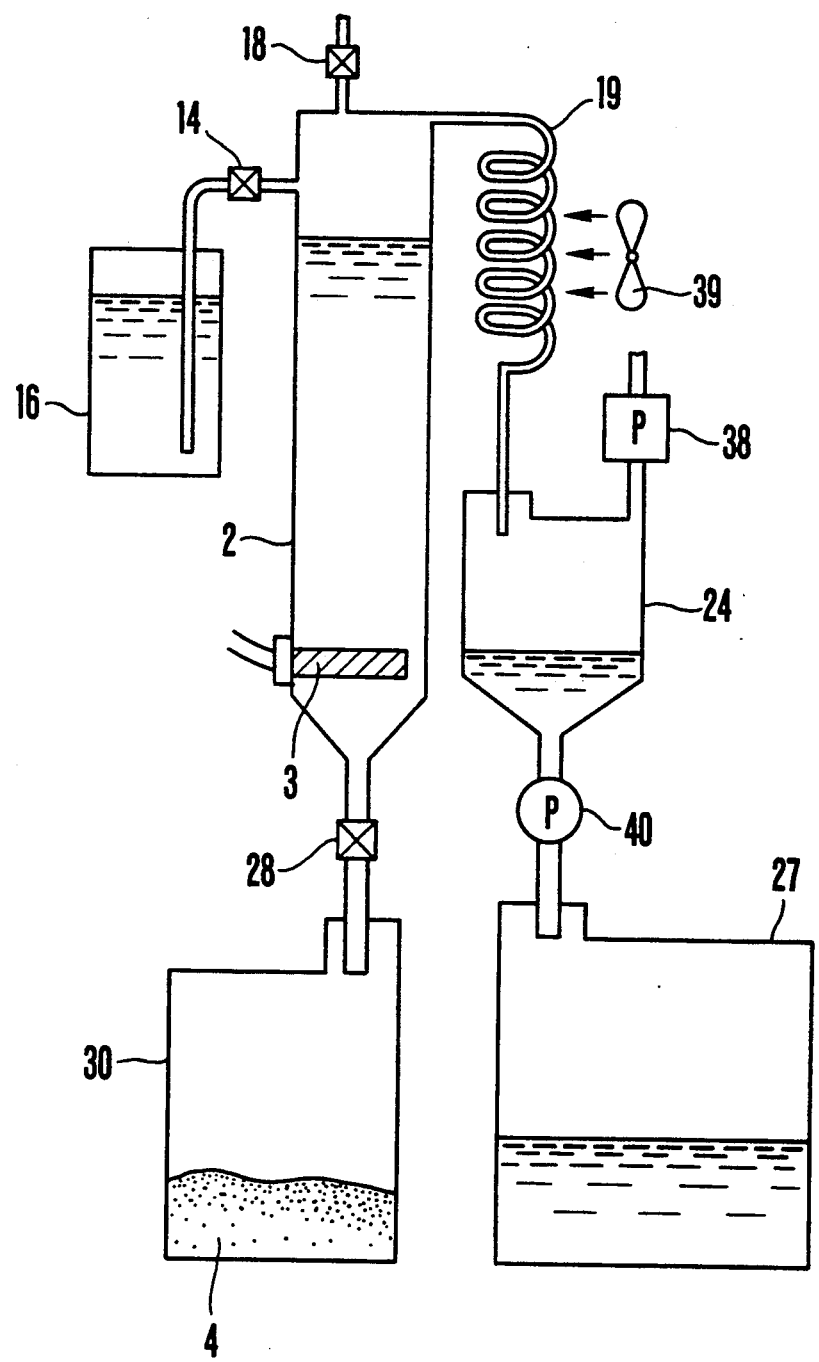
Figure 7:
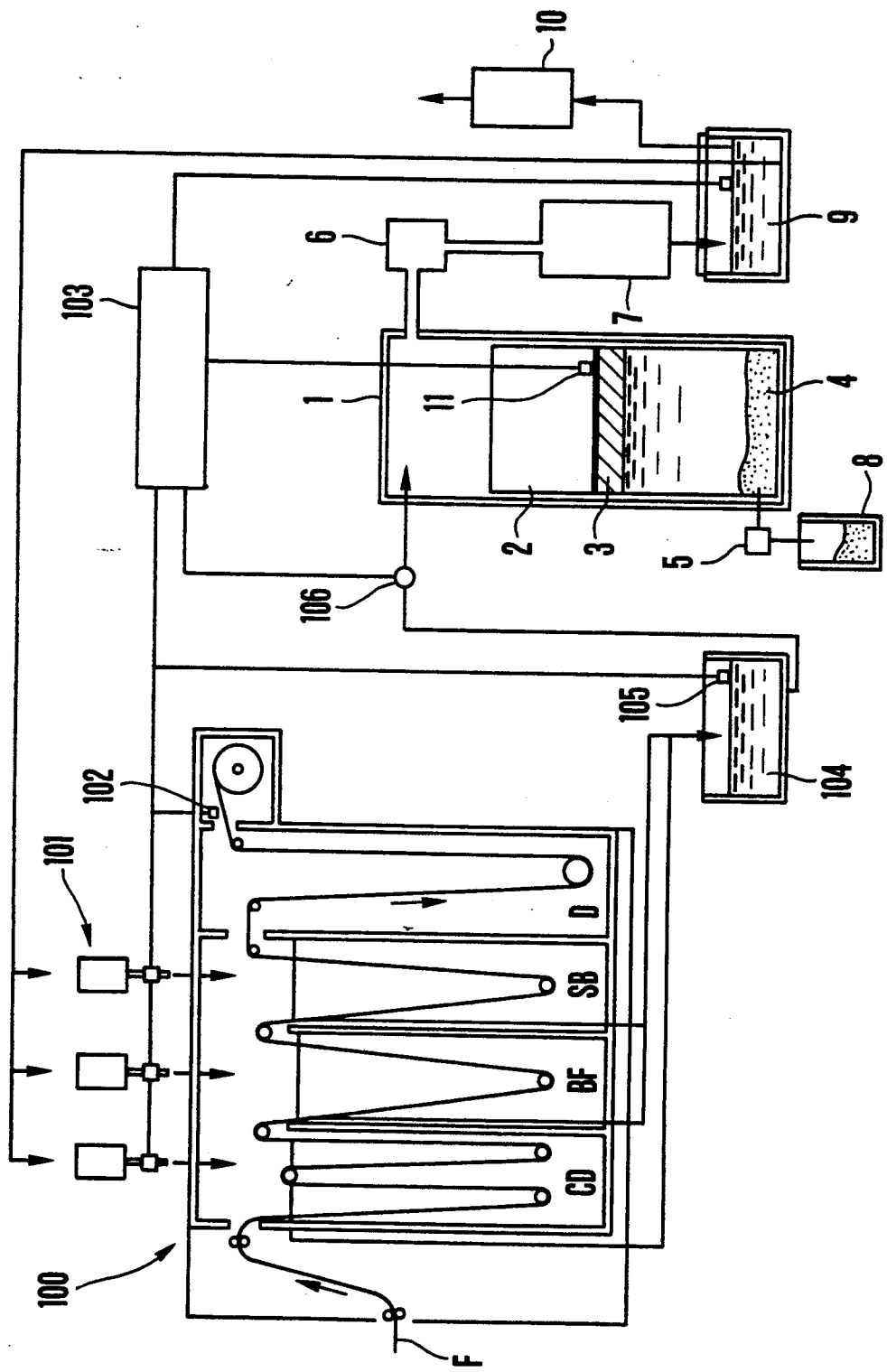
FIG. 7 to FIG. 12 are schematic illustrations showing examples in which the apparatuse has the same constitution as in FIG. 1 to FIG. 6, respectively, except that a heating means is provided at an upper part of the photographic process waste liquor.

In FIG. 5, the photographic process waste liquor is fed to a bag 36 fitted in the inside of the evaporating vessel 2, by driving a diaphragm pump 37, and the inside of the evaporating vessel 2 is put in a pressure-reduced state by driving a vacuum pump 38 provided on a condensate water tank 27. The condensate water led from the evaporating vessel 2 to the condensate water tank 27 is cooled by a cooling fan 39 disposed at a cooling section of a vapor-discharging pipe 19. FIG. 6 illustrates an example in which an auxiliary condensate water tank 24 is connected to a condensate water tank 27 through a pump 40, wherein the condensate water in the auxiliary condensate water tank 24 is fed in a very small amount and under high pressure to the condensate water tank 27 by driving the pump 40.

FIGS. 7 to 12 are schematic illustration showing other examples in which the apparatus has the same constitution as in FIGS. 1 to 6, respectively, except that the heating means is provided at an upper part of the photographic process waste liquor.

FIG. 13 is a schematic illustration showing an example in which the apparatus has a constitution similar to that in FIG. 9, except that a heater 34 is replaced with a conventional heater 3 as in FIG. 8, and has a characteristic feature in the shape of the evaporating vessel.

Test Examples

After imagewise printing on a commercially available color photographic paper, continuous processing was carried out with use of the following processing steps and processing solutions.

Standard processing steps

| (1) Color developing | 38° C. | 3 min. |
|---|---|---|
| (2) Bleach-fixing | 38° C. | 1 min. 30 sec. |
| (3) Stabilizing | 25° C. to 35° C. | 3 min. |
| (4) Drying | 75° C. to 100° C. | about 2 min. |

Composition of processing solutions

Color developing tank solution

| | |
|---|---|
| Benzyl alcohol | 15 ml |
| Ethylene glycol | 15 ml |
| Potassium sulfite | 2.0 g |
| Potassium bromide | 1.3 g |
| Sodium chloride | 0.2 g |
| Potassium carbonate | 24.0 g |
| 3-Methyl-4-amino-N-ethyl-N-($\beta$-methanesulfonamideoethyl)aniline sulfate | 4.5 g |
| Brightening agent (a 4,4'-diaminostilbenedisulfonic acid derivative) | 1.0 g |
| Hydroxylamine sulfate | 3.0 g |
| 1-Hydroxyethylidene-1,1-diphosphonic acid | 0.4 g |
| Hydroxyethyliminodiacetic acid | 5.0 g |
| Magnesium chloride.hexahydrate | 0.7 g |
| Disodium 1,2-dihydroxybenzene-3,5-disulfonate | 0.2 g |

Made up to 1 liter by adding water, and adjusted to pH 10.20 using potassium hydroxide and sulfuric acid.

Color developing replenishing solution

| | |
|---|---|
| Benzyl alcohol | 20 ml |
| Ethylene glycol | 20 ml |
| Potassium sulfite | 3.0 g |
| Potassium carbonate | 24.0 g |
| Hydroxylamine sulfate | 4.0 g |
| 3-Methyl-4-amino-N-ethyl-N-($\beta$-methanesulfonamideoethyl)aniline sulfate | 6.0 g |
| Brightening agent (a 4,4'-diaminostilbenedisulfonic acid derivative) | 2.5 g |
| 1-Hydroxyethylidene-1,1-diphosphonic acid | 0.5 g |
| Hydroxyethyliminodiacetic acid | 5.0 g |
| Magnesium chloride.hexahydrate | 0.8 g |
| Disodium 1,2-dihydroxybenzene-3,5-disulfonate | 0.3 g |

Made up to 1 liter by adding water, and adjusted to pH 10.70 using potassium hydroxide and sulfuric acid.

Bleach-fixing tank solution

| | |
|---|---|
| Ethylenediaminetetraacetic acid ferric ammonium dihydrate | 60.0 g |
| Ethylenediaminetetraacetic acid | 3.0 g |
| Ammonium thiosulfate (a 70% solution) | 100 ml |
| Ammonium sulfite (a 40% solution) | 27.5 ml |

Made up to 1 liter as a whole by adding water, and adjusted to pH 7.1 using potassium carbonate or glacial acetic acid.

Bleach-fixing replenishing solution A

| | |
|---|---|
| Ethylenediaminetetraacetic acid ferric ammonium dihydrate | 260.0 g |
| Potassium carbonate | 42.0 g |

Made up to 1 liter as a whole by adding water. The pH of this solution is adjusted to 6.7±0.1 with use of acetic acid or ammonia water.

Bleach-fixing replenishing solution B

| | |
|---|---|
| Ammonium thiosulfate (a 70% solution) | 500.0 ml |
| Ammonium sulfite (a 40% solution) | 250.0 ml |
| Ethylenediaminetetraacetic acid | 17.0 g |
| Glacial acetic acid | 85.0 ml |

Made up to 1 liter as a whole by adding water. The pH of this solution is adjusted to 5.3±0.1 with use of acetic acid or ammonia water.

Washing-substitutive stabilizing tank solution and replenishing solution

| | |
|---|---|
| Ethylene glycol | 1.0 g |
| 2-Methyl-4-isothiazolin-3-on | 0.20 g |
| 1-Hydroxyethylidene-1,1-diphosphonic acid (a 60% solution) | 1.0 g |
| Ammonia water (a 25% aqueous solution of ammonium hydroxide) | 2.0 g |

Made up to 1 liter using water, and adjusted to pH 7.0 using 50 % sulfuric acid.

An automatic processing machine was filled in the tanks with the above color developing tank solution, bleach-fixing tank solution and stabilizing tank solution to carry out a running test while processing a sample of the above commercially available color photographic paper sample and while supplying the above color developing replenishing solution, bleach-fixing replenishing solutions A and B and stabilizing replenishing solution through a bellows pump at intervals of 3 minutes. The amount for replenishing was such that the color developing tank was replenished in an amount of 190 ml, the bleach-fixing tank was replenished in an amount of 50 ml for each of the bleach-fixing replenishing solutions A and B, and the stabilizing tank was replenished with the washing-substitutive stabilizing replenishing solution in an amount of 250 ml, each per 1 m² of the color photographic paper. The stabilizing tank in the automatic processing machine was comprised of stabilizing tanks comprising a first to third tanks in the direction of the flow of the sample, wherein the replenishing was carried out from the last tank, the solution overflowed from the last tank was flowed into the tank anterior thereto and further the solution overflowed therefrom was flowed into the tank further anterior thereto, taking the multi-tank counter-current system.

The continuous processing was carried out until the total replenishing amount of the washing-substitutive stabilizing solution reaches 3 times of the capacity of the stabilizing tank.

Twenty lits. of photographic process waste liquor in which the three kinds of overflowed solutions obtained by the above processing were mixed was treated with use of the apparatus shown in FIG. 2.

The concentration-by-evaporation treatment was carried out respectively in the cases in which the voltage to the pump 25 of the ejector 23 was changed to vary the pressure-reduced state as shown in Table 1. The temperature of the photographic process waste liquor in the evaporating vessel 2 is shown in Table 1. The concentration of ammonia gas at the time when the photographic process waste liquor was concentrated to ½ was measured and also the condensate water available when kept at 30° C. was smelled to obtain the results as shown in Table 1. The respective samples were further successively subjected to the concentration by evaporation to find the concentration rate at the time when thiosulfate in the concentrated liquid present in the evaporating vessel 2 was decomposed to be formed into a sulfide and hydrogen sulfide began to appear in the condensate water.

TABLE 1

| Pressure (mmHg) | Temp. in evaporating vessel (°C.) | When concentrated to ½ | | Concentration rate at which hydrogen sulfide was formed |
|---|---|---|---|---|
| | | Ammonia gas (ppm) | Smell test | |
| 760 | 102 | 230 | C | ½ |
| 610 | 95 | 100 | B | 1/6 |
| 520 | 90 | 70 | B | ⅛ |
| 420 | 85 | 30 | A | 1/15 |
| 350 | 80 | 20 | A | 1/15 |
| 230 | 70 | 10 | A | No sulfide formed even at 1/20 |
| 140 | 60 | 6 | A | No sulfide formed even at 1/20 |
| 90 | 50 | 5 | A | No sulfide formed even at 1/20 |
| 50 | 40 | 5 | A | No sulfide formed even at 1/20 |

Smell test (5 persons):
A: Little smelled (4 persons in 5 persons)
B: A little smelled (3 persons in 5 persons)
C: Seriously smelled (5 persons in 5 persons)

As will be clear from Table 1, the generation of ammonia gas decreases when the pressure is reduced, and there can be obtained the result that there is little smell. Thus, it is preferable to reduce the pressure in the concentration-by-evaporation treatment of the photographic process waste liquor, resulting in prevention of the smell from being generated.

Test Example 2

20 lits. of photographic process waste liquor in which the three kinds of overflowed solutions obtained by processing in the same manner as in Test Example 1 were mixed was treated with use of the apparatus shown in FIG. 13.

In this Test Example, the concentration by evaporation is carried out by keeping a ball valve 41 open. Accordingly, a settling-holding section 2b serves as part of an evaporating vessel 2 together with a liquid-holding section (reservoir section) 2a.

Figure 14:
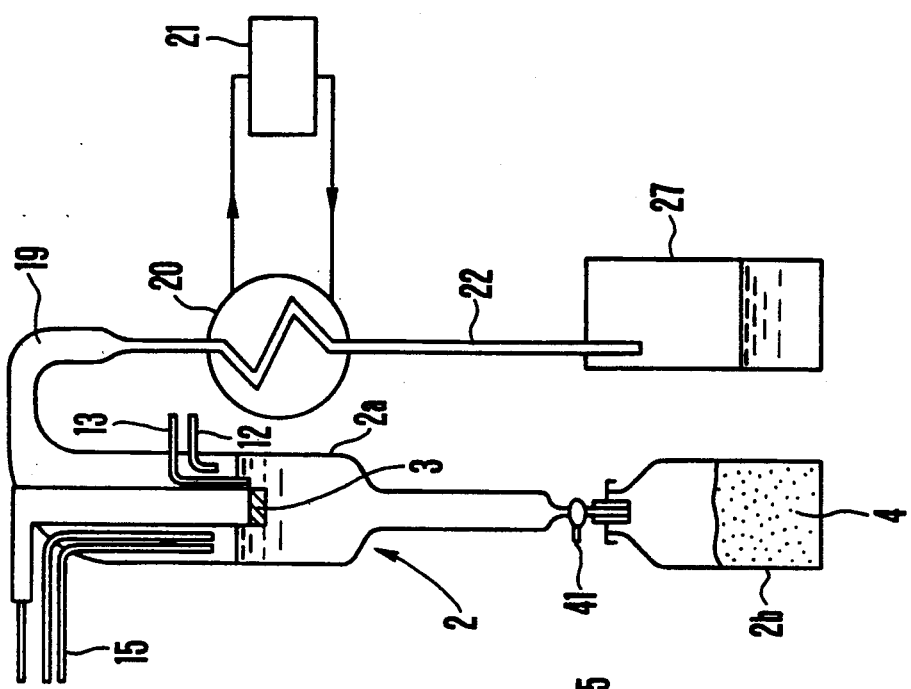
FIG. 14 to FIG. 16 are schematic illustrations showing comparative examples.
Figure 15:
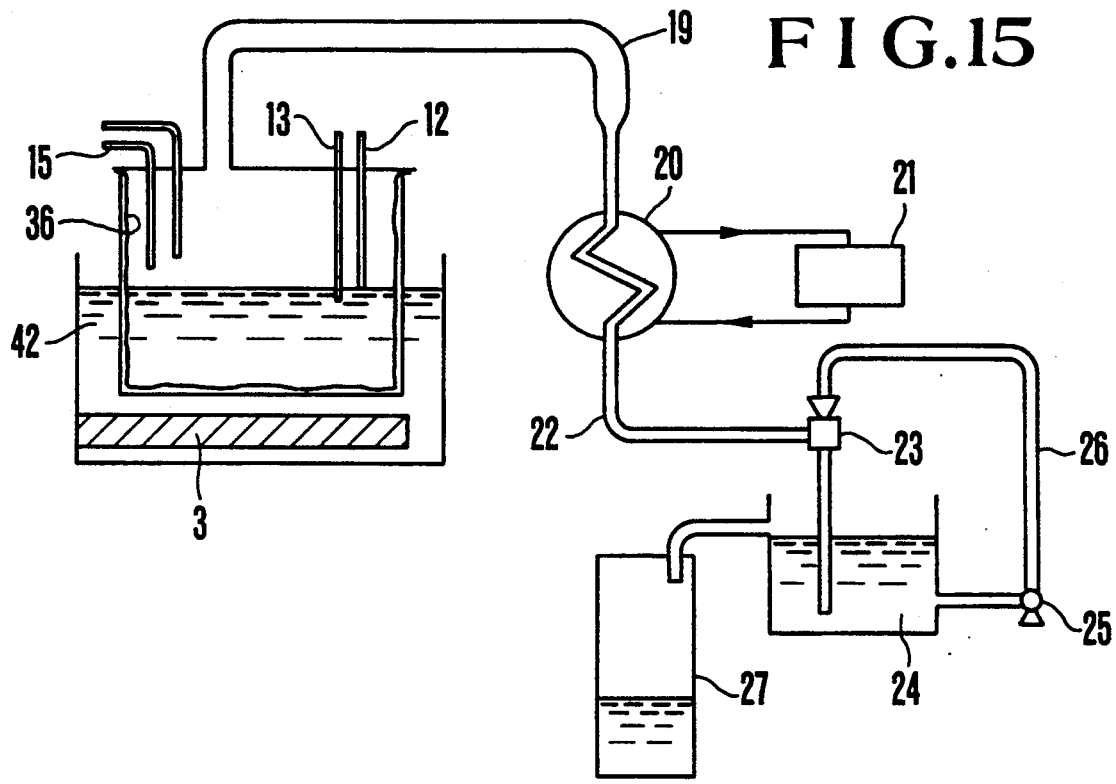
Figure 16:
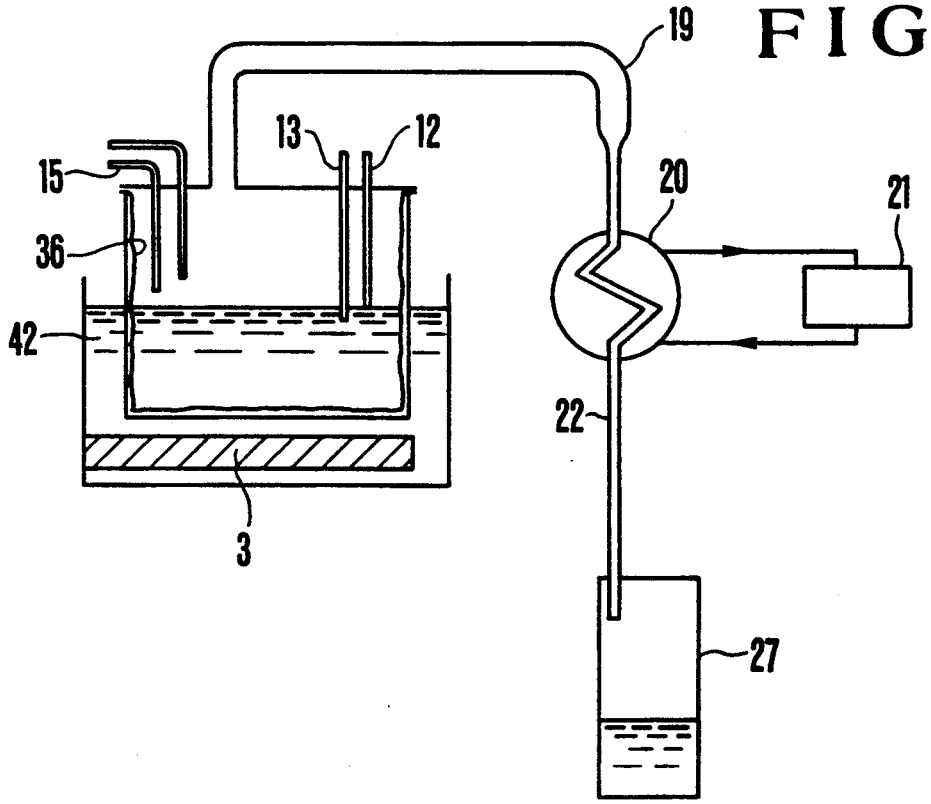

Comparative treatment apparatus B to D other than the treatment apparatus A shown in FIG. 13 of this invention are shown in FIG. 14 to FIG. 16, and similar comparative tests were carried out using the treatment apparatus B to D. FIG. 14 shows a comparative apparatus incorporated with no pressure reducing means, and the evaporating vessel 2 and the waste liquor feeding section have the same construction as those in the treatment apparatus shown sin FIG. 13 of this invention. Here, the vapor generated by evaporation is cooled and condensed by a condenser 20, and stocked in a condensate water tank 27. FIG. 15 shows a treatment apparatus incorporated with the pressure reducing means similar to that in FIG. 13, but, in this instance, the heating means 3 is provided in a silicone oil bath 42, so that the bottom part of an evaporating vessel 2 is heated by the heated silicone oil bath 42. After the concentration is completed, the concentrate is taken out outside the evaporating vessel 2 together with a bag 36 by opening an upper part of the evaporating vessel 2. FIG. 16 shows an apparatus in which the pressure reducing means was removed from the treatment apparatus shown in FIG. 15, and the section of the evaporating vessel 2 has the same construction as in the treatment apparatus shown in FIG. 15.

In treatment apparatus A and C, the pressure was reduced to 55 mmHg. In treatment apparatus A and B, the distance between the heating means 3 and the bottom part of the photographic process waste liquor was controlled by controlling the position for mounting the heating means 3 so as to give a temperature difference of 10° C. between the vicinity of the heated part and the bottom of the photographic process waste liquor. The capacity of the evaporating vessel 2 at the position lower than the lower limit liquid level sensor 13 was made to be 2.0 lits. in every case, provided that, in treatment apparatus A of this invention and comparative treatment apparatus B, the corresponding capacity was made to be 2.0 lits. including the capacity of the settlings-holding section 2b. The heating means 3 was made to have a heat capacity of 1.5 kW in every case.

The process of evaporation according to treatment apparatus A to D was observed, and the state of how bumping takes place as the concentration proceeds is set out in Table 2. The time until the evaporation treatment is completed is also measured and set out in Table 2.

The gas (ammonia and hydrogen sulfide) on the liquid surface of the condensate water in the condensate water tank 27 is detected at the time when 30 lits. of the photographic process waste liquor stocked in the waste liquor tank 9 were fed in the evaporating vessel 2. The results thus obtained are also set out in Table 2.

TABLE 2

| Treatment apparatus | Stage at which bumping begins*1 | Time required (hr) | Ammonia gas (ppm) | Hydrogen sulfide gas (ppm) |
|---|---|---|---|---|
| A (FIG. 13; Invention) | No bumping | 14 | 5 | 0 |
| B (FIG. 14; Comparative) | No bumping | 16 | 100 | 20 |
| C (FIG. 15; Comparative) | 25 l | 20 | 150 | 30 |
| D (FIG. 16; Comparative) | 16 l | 22 | 200 | 50 |

*1Indicated in terms of the quantity of the waste liquor fed from the waste liquor tank 16 to the evaporating vessel 2.

As will be clear from Table 2, it is understood that in treatment apparatus A of this invention, the bumping may not readily take place, the time required until the evaporation is completed is short, and the gass may be generated in less amount, as compared with comparative treatment apparatus B to D.

The residues obtained after treatment by treatment apparatus D were in the form of sludge concentrated to the degree of about 1/13, about 1/15 in treatment apparatus C, and about 1/30 in treatment apparatus B, but the sludge obtained by treatment apparatus A was concentrated to a higher degree, and found to be comprised of the settlings concentrated to 1/35 or more of the initial waste liquor.

Also, the settlings-holding section had so low temperature in each of treatment apparatus A, B and C that it was possible to detach it in 1 hour, or, particularly in treatment apparatus A and B, immediately. However, in treatment apparatus D, it was impossible to take away the bag 36 before it was left overnight.

Test Example 3

Using treatment apparatus A shown in FIG. 13 and treatment apparatus B shown in FIG. 14, the treatment was repeated in the same manner as in Test Example 2. However, the voltage to the pump for reducing the pressure was changed here to vary the pressure in the evaporating vessel 2 as shown in Table 3, and at the same time the heat capacity of the heating means 3 was also changed to also vary the temperature of the photographic process waste liquor in the vicinity of the heated part as shown in Table 3. The temperature at the bottom part of the photographic process waste liquor was controlled to be kept at 25° C. in every case by changing the position of the heating means 3.

The time required for treating 30 lits. of the photographic process waste liquor was also measured to obtain the results as shown together in Table 3, provided that measured was the amount of the photographic process waste liquor fed to the evaporating vessel 2 in 30 hours in the instances in which more than 30 hours were required.

TABLE 3

| Pressure in evaporating vessel (mmHg) | Temp. of photographic process waste liquor in the vicinity of the heated part (°C.) | Treatment time (hr) | Amount of photographic process waste liquor fed to evaporating vessel (lit.) | Ammonia gas (ppm) | Hydrogen sulfide gas (ppm) |
|---|---|---|---|---|---|
| Treatment apparatus A | | | | | |
| 610 | 95 | 16 | 30 | 70 | 15 |
|  | 70 | — | 25 | 50 | 13 |
|  | 40 | — | 20 | 20 | 10 |
| 520 | 90 | 17 | 30 | 50 | 11 |
|  | 70 | 26 | 30 | 40 | 9 |
|  | 40 | — | 25 | 15 | 10 |
| 230 | 70 | 15 | 30 | 30 | 7 |
|  | 40 | 25 | 30 | 8 | 5 |
|  | 30 | — | 25 | 5 | 2 |
| 50 | 40 | 13 | 30 | 4 | 0 |
|  | 35 | 20 | 30 | 4 | 0 |
|  | 30 | 25 | 30 | 3 | 0 |
| Treatment apparatus B | | | | | |
| — | 100 | 25 | 30 | 90 | 20 |
| — | 90 | — | 25 | 80 | 20 |
| — | 70 | — | 20 | 70 | 15 |

As will be clear from Table 3, the generation of ammonia gas and hydrogen sulfide gas can be suppressed in treatment apparatus B by lowering the temperature of the photographic process waste liquor in the vicinity of the heated part, but a very long treatment time is required. In contrast thereto, in treatment apparatus A in which the pressure in the evaporating vessel 2 was reduced by the pressure reducing means, it is understood that the prolonged treatment time caused by the temperature fall of the photographic process waste liquor in the vicinity of the heated part becomes negligible, and also the generation of ammonia gas and hydrogen sulfide gas can be suppressed by the synergistic effect brought about by reduced pressure and by the temperature fall of the photographic process waste liquor in the vicinity of the heated part.

We claim:

1. A method of treating photographic process waste liquor containing a component selected from the group consisting of thiosulfate, sulfites, and ammonium salts, through concentration by evaporation, consisting essentially of the steps:
    (a) supplying waste liquor containing a component selected from the group consisting of thiosulfate, sulfites, and ammonium salts, to an evaporating vessel;
    (b) evaporating liquid from photographic process waste liquor by heating the photographic process waste liquor in the upper part of said evaporating vessel;
    (c) maintaining both a reduced pressure of 610 mm Hg or less and at least 5° C. differential between the temperature of the photographic process waste liquor in the upper part of the vessel and the temperature of the photographic process waste liquor in the bottom part of the evaporating vessel thereby concentrating the photographic waste liquor whereby solute precipitates; and
    (d) allowing solute which precipitates from the photographic process waste liquor to settle toward said bottom part;
    thereby to restrain decomposition of the solute and the formation of noxious cases.

2. The method of claim 1 wherein said reduced pressure is 10 to 520 mm Hg.

3. The method of claim 1, wherein said temperature difference is at least 10° C.

4. The method of claim 1, wherein said temperature difference is at least 30° C.

5. The method of claim 1, wherein said temperature difference is at least 40° C.

6. The method of claim 1, wherein said temperature difference is at least 50° C.

7. The method of claim 1, wherein additional photographic process waste liquor to be treated is continuously and/or intermittently fed depending on a decrease in said photographic process waste liquor.

8. The method of claim 1, wherein said settled solute in the photographic process waste liquor is removed.

9. The method of claim 8, wherein the photographic process waste liquor is concentrated by evaporation while said settled solute in the photographic process waste liquor is removed.

* * * * *